(12) United States Patent
Yang et al.

(10) Patent No.: US 9,854,036 B2
(45) Date of Patent: Dec. 26, 2017

(54) METHOD FOR MIGRATING MEMORY DATA OF VIRTUAL MACHINE, AND RELATED APPARATUS AND CLUSTER SYSTEM

(71) Applicant: Huawei Technologies Co., Ltd., Shenzhen, Guangdong (CN)

(72) Inventors: Jie Yang, Hangzhou (CN); Xiaofeng Zhang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 696 days.

(21) Appl. No.: 14/534,446

(22) Filed: Nov. 6, 2014

(65) Prior Publication Data
US 2015/0095443 A1   Apr. 2, 2015

Related U.S. Application Data

(63) Continuation of application No. PCT/CN2014/074391, filed on Mar. 31, 2014.

(30) Foreign Application Priority Data

Sep. 30, 2013   (CN) .......................... 2013 1 0462273

(51) Int. Cl.
*G06F 13/28* (2006.01)
*H04L 29/08* (2006.01)
*G06F 9/455* (2006.01)

(52) U.S. Cl.
CPC ...... *H04L 67/1095* (2013.01); *G06F 9/45558* (2013.01); *G06F 2009/4557* (2013.01)

(58) Field of Classification Search
CPC ............ H04L 67/1095; G06F 9/45558; G06F 2009/4557
See application file for complete search history.

(56) References Cited

U.S. PATENT DOCUMENTS 9,323,677 B2 * 4/2016 Dube .................... G06F 12/084
2007/0288921 A1 12/2007 King et al.
(Continued)

FOREIGN PATENT DOCUMENTS

CN    101464812 A    6/2009
CN    102081552 A    6/2011
(Continued)

OTHER PUBLICATIONS

Shlomi Noach, "Virtual Memory: pages and pages frames," the Monkey Trials, Oct. 2012.*
(Continued)

*Primary Examiner* — Oanh Duong

(57) ABSTRACT

A method for migrating memory data of a virtual machine, and a related apparatus, and a cluster system are provided. The method includes: obtaining a data sending request for sending memory data of a first virtual machine, where the request includes an identity of the first virtual machine and a PFN of the memory data that is requested to be sent; querying a correspondence information base according to the identity of the first virtual machine to obtain a correspondence of the first virtual machine; querying the correspondence of the first virtual machine according to the PFN of the memory data that is requested to be sent, so as to obtain a physical memory page address of the memory data; and sending, to a destination physical host by using an RDMA network adapter, memory data stored at the physical memory page address of the memory data.

18 Claims, 11 Drawing Sheets

(56) References Cited

U.S. PATENT DOCUMENTS

| | | | |
|---|---|---|---|
| 2011/0119427 A1* | 5/2011 | Dow | G06F 9/5088 |
| | | | 711/6 |
| 2012/0110237 A1 | 5/2012 | Li et al. | |
| 2012/0137292 A1 | 5/2012 | Iwamatsu et al. | |
| 2012/0185856 A1 | 7/2012 | Ashihara et al. | |
| 2012/0259940 A1 | 10/2012 | Magro et al. | |
| 2013/0083690 A1 | 4/2013 | Cardona et al. | |
| 2013/0110959 A1* | 5/2013 | Sharp | G06F 9/5016 |
| | | | 709/212 |
| 2013/0179971 A1* | 7/2013 | Harrison | G06F 21/564 |
| | | | 726/23 |
| 2014/0019701 A1* | 1/2014 | Ohira | G06F 3/0613 |
| | | | 711/165 |
| 2014/0052948 A1* | 2/2014 | Qiu | G06F 9/485 |
| | | | 711/162 |
| 2014/0201451 A1* | 7/2014 | Dube | G06F 12/084 |
| | | | 711/130 |
| 2014/0259169 A1* | 9/2014 | Harrison | G06F 21/554 |
| | | | 726/23 |
| 2015/0052323 A1* | 2/2015 | Noel | G06F 12/00 |
| | | | 711/162 |
| 2015/0089009 A1* | 3/2015 | Tsirkin | G06F 3/067 |
| | | | 709/212 |
| 2015/0089010 A1* | 3/2015 | Tsirkin | G06F 12/126 |
| | | | 709/212 |
| 2016/0267051 A1* | 9/2016 | Metzler | G06F 9/45558 |

FOREIGN PATENT DOCUMENTS

| | | |
|---|---|---|
| CN | 102576343 A | 7/2012 |
| CN | 102801806 A | 11/2012 |
| CN | 103530167 A | 1/2014 |

OTHER PUBLICATIONS

Wei Huang, et al., "High Performance Virtual Machine Migration with RDMA over Modern Interconnects", IEEE, Sep. 17, 2007, p. 11-20.

Michael R. Hines, et al., "Post-Copy Based Live Virtual Machine Migration Using Adaptive Pre-Paging and Dynamic Self-Ballooning", Mar. 11, 2009, p. 51-60.

* cited by examiner

| Data sending request 1 | Data sending request 2 | Data sending request 3 | ... |
|---|---|---|---|

FIG. 4

METHOD FOR MIGRATING MEMORY DATA OF VIRTUAL MACHINE, AND RELATED APPARATUS AND CLUSTER SYSTEM

CROSS-REFERENCE TO RELATED APPLICATIONS

This application is a continuation of International Application No. PCT/CN2014/074391, filed on Mar. 31, 2014, which claims priority to Chinese Patent Application No. 201310462273.3, filed on Sep. 30, 2013, both of which are hereby incorporated by reference in their entireties.

TECHNICAL FIELD

The present invention relates to the communications field, and in particular, to a method for migrating memory data of a virtual machine, and a related apparatus and a cluster system.

BACKGROUND

Virtual machine migration is mainly sending data of memory of a virtual machine from a source physical host to a destination physical host. Virtual machine migration is a main part of virtual machine live migration. In virtual machine live migration, a virtual machine may be migrated from a source physical host to a destination physical host when the virtual machine is running, and continues to run on the destination physical host, thereby implementing service integration. Virtual machine live migration may be used to implement online maintenance, online upgrade, and load balancing on a server, and to provide a solution for disaster recovery.

In the prior art, on a Xen virtualization platform, virtual machine migration is performed by using a method of sending, in an iterative manner, data of memory of a virtual machine. During each iteration, dirty pages of the current iteration are selected in batches and these pages are mapped to a linear address space of a user process of a privileged virtual machine; after the mapping is complete, a hypercall is used to update a page table, so as to establish an association between the linear address space and a physical address; and after a mapped linear address is obtained, a remote direct memory access (RDMA) interface of user space is used to register the mapped physical address corresponding to the memory of the virtual machine with an RDMA network adapter, and subsequent data transmission is performed according to an RDMA communications protocol by calling another RDMA system. After data is sent successfully, the memory of the virtual machine is demapped from a user process space, and a registered physical memory is deregistered.

The inventor finds that the prior art has at least the following problems: On a virtualization platform, virtual machine migration requires mapping of memory of a virtual machine and updating, by using a hypercall, of a page table, which causes a high utilization rate and high time overhead on a central processing unit (CPU) in a physical host on which the virtual machine is located.

SUMMARY

Embodiments of the present invention provide a method for migrating memory data of a virtual machine, and a related apparatus and a cluster system, so as to reduce a utilization rate and time overhead of a processor in a physical host on which the virtual machine is located.

Technical solutions used by the embodiments of the present invention are as follows:

According to a first aspect, a method for migrating memory data of a virtual machine is provided, including:

obtaining a data sending request for sending memory data of a first virtual machine, where the data sending request includes an identity of the first virtual machine and a physical frame number (PFN) of the memory data that is requested to be sent;

querying a correspondence information base according to the identity of the first virtual machine to obtain a correspondence of the first virtual machine, where the correspondence information base includes a correspondence of a virtual machine to be migrated, and the correspondence of the virtual machine is a correspondence established between a PFN of memory of the virtual machine and a physical memory page address of the memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine;

querying the correspondence of the first virtual machine according to the PFN of the memory data that is requested to be sent, so as to obtain a physical memory page address of the memory data that is requested to be sent; and sending, to a destination physical host by using an RDMA network adapter, memory data stored at the physical memory page address of the memory data that is requested to be sent.

In a first possible implementation manner, according to the first aspect, before the obtaining a data sending request for sending memory data of a first virtual machine, the method further includes:

obtaining a migration request that is triggered by a user process of a privileged virtual machine and used for migrating the memory data of the first virtual machine, where the migration request includes the identity of the first virtual machine;

obtaining an address space of memory of the first virtual machine according to the identity of the first virtual machine in the migration request;

obtaining a PFN of the memory of the first virtual machine according to the address space;

calculating a physical memory page address of the memory of the first virtual machine according to the PFN of the memory of the first virtual machine; and establishing a correspondence between the PFN of the memory of the first virtual machine and the physical memory page address of the memory of the first virtual machine.

In a second possible implementation manner, with reference to the first possible implementation manner, after the calculating a physical memory page address of the memory of the first virtual machine according to the PFN of the memory of the first virtual machine and before the obtaining a data sending request for sending memory data of a first virtual machine, the method further includes:

registering the physical memory page address of the memory of the first virtual machine with the RDMA network adapter.

In a third possible implementation manner, with reference to the first aspect or the first possible implementation manner, after the querying the correspondence of the first virtual machine according to the PFN of the memory data that is requested to be sent, so as to obtain a physical memory page address of the memory data that is requested to be sent, and before the sending, to a destination physical host by using an RDMA network adapter, memory data stored at the physical memory page address of the memory data that is requested to be sent, the method further includes:

registering, with the RDMA network adapter, the physical memory page address of the memory data that is requested to be sent.

In a fourth possible implementation manner, with reference to the first aspect or any one of the first possible implementation manner to the third possible implementation manner, the obtaining a data sending request for sending memory data of a first virtual machine includes:

extracting data sending requests in a data sending request queue in sequence, where the data sending requests include data sending requests of different virtual machines to be migrated, and the data sending requests in the data sending request queue are sorted according to a sequence of time or priorities.

According to a second aspect, a physical host is provided, including:

a memory that stores instructions; and a processor coupled to the memory and configured to execute the instructions to:

obtain a data sending request for sending memory data of a first virtual machine, wherein the data sending request comprises an identity of the first virtual machine and a physical frame number PFN of the memory data that is requested to be sent;

query a correspondence information base according to the identity of the first virtual machine to obtain a correspondence of the first virtual machine, wherein the correspondence information base comprises a correspondence of a virtual machine to be migrated, and the correspondence of the virtual machine is a correspondence established between a PFN of memory of the virtual machine and a physical memory page address of the memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine;

query the correspondence of the first virtual machine according to the PFN of the memory data that is requested to be sent, so as to obtain a physical memory page address of the memory data that is requested to be sent; and send, to a destination physical host by using a remote direct memory access (RDMA) network adapter, memory data stored at the physical memory page address of the memory data that is requested to be sent.

In a first possible implementation manner, with reference to the second aspect, before the step of obtaining the data sending request for sending the memory data of the first virtual machine, where the processor is further configured to: obtain a migration request that is triggered by a user process of a privileged virtual machine and used for migrating the memory data of the first virtual machine, where the migration request includes the identity of the first virtual machine;

obtain an address space of memory of the first virtual machine according to the identity of the first virtual machine in the migration request;

obtain a PFN of the memory of the first virtual machine according to the address space;

calculate a physical memory page address of the memory of the first virtual machine according to the PFN of the memory of the first virtual machine; and establish a correspondence between the PFN of the memory of the first virtual machine and the physical memory page address of the memory of the first virtual machine.

In a second possible implementation manner, with reference to the first possible implementation manner, after the step of calculating the physical memory page address of the memory of the first virtual machine according to the PFN of the memory of the first virtual machine and before the step of obtaining the data sending request for sending the memory data of the first virtual machine, where the processor is further configured to:

register the physical memory page address of the memory of the first virtual machine with the RDMA network adapter.

In a third possible implementation manner, with reference to the second aspect or the first possible implementation manner, after the step of querying the correspondence of the first virtual machine according to the PFN of the memory data that is requested to be sent, so as to obtain the physical memory page address of the memory data that is requested to be sent, and before the step of sending, to the destination physical host by using the RDMA network adapter, the memory data stored at the physical memory page address of the memory data that is requested to be sent, the processor is further configured to: register, with the RDMA network adapter, the physical memory page address of the memory data that is requested to be sent.

In a fourth possible implementation manner, with reference to the second aspect or any one of the first possible implementation manner to the third possible implementation manner, the processor is further configured to extract data sending requests in a data sending request queue in sequence, where the data sending requests include data sending requests of different virtual machines to be migrated, and the data sending requests in the data sending request queue are sorted according to a sequence of time or priorities.

According to a third aspect, a physical host is provided, including: a hardware layer, a host running on the hardware layer, and at least one virtual machine VM running on the host, where the hardware layer includes a remote direct memory access RDMA network adapter, the at least one virtual machine includes a first virtual machine, and the host is configured to:

obtain a data sending request for sending memory data of the first virtual machine, where the data sending request includes an identity of the first virtual machine and a physical frame number PFN of the memory data that is requested to be sent;

query a correspondence information base according to the identity of the first virtual machine to obtain a correspondence of the first virtual machine, where the correspondence information base includes a correspondence of a virtual machine to be migrated, and the correspondence of the virtual machine is a correspondence established between a PFN of memory of the virtual machine and a physical memory page address of the memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine;

query the correspondence of the first virtual machine according to the PFN of the memory data that is requested to be sent, so as to obtain a physical memory page address of the memory data that is requested to be sent; and send, to a destination physical host by using the remote direct memory access RDMA network adapter, memory data stored at the physical memory page address of the memory data that is requested to be sent.

In a first possible implementation manner, with reference to the third aspect, the host is further configured to:

before obtaining the data sending request for sending the memory data of the first virtual machine, obtain a migration request that is triggered by a user process of a privileged virtual machine and used for migrating the memory data of the first virtual machine, where the migration request includes the identity of the first virtual machine;

obtain an address space of memory of the first virtual machine according to the identity of the first virtual machine in the migration request;

obtain a PFN of the memory of the first virtual machine according to the address space;

calculate a physical memory page address of the memory of the first virtual machine according to the PFN of the memory of the first virtual machine; and establish a correspondence between the PFN of the memory of the first virtual machine and the physical memory page address of the memory of the first virtual machine.

In a second possible implementation manner, with reference to the first possible implementation manner, the host is further configured to:

after calculating the physical memory page address of the memory of the first virtual machine according to the PFN of the memory of the first virtual machine, and before obtaining the data sending request for sending the memory data of the first virtual machine, register the physical memory page address of the memory of the first virtual machine with the RDMA network adapter.

In a third possible implementation manner, with reference to the third aspect or the first possible implementation manner, the host is further configured to: after querying the correspondence of the first virtual machine according to the PFN of the memory data that is requested to be sent, so as to obtain the physical memory page address of the memory data that is requested to be sent, and before sending, to the destination physical host by using the RDMA network adapter, the memory data stored at the physical memory page address of the memory data that is requested to be sent, register, with the RDMA network adapter, the physical memory page address of the memory data that is requested to be sent.

According to a fourth aspect, a cluster system is provided, including: a plurality of physical hosts described above, where the plurality of physical hosts include a source physical host and a destination physical host, and each physical host includes a hardware layer, a host running on the hardware layer, at least one virtual machine VM running on the host, and the hardware layer includes an RDMA network adapter.

As can be seen from the above, a physical host in the embodiments of the present invention may include a hardware layer, a host running on the hardware layer, and at least one virtual machine VM running on the host, where the hardware layer includes an RDMA network adapter, and the at least one virtual machine includes a first virtual machine. The host is configured to obtain a data sending request for sending memory data of the first virtual machine, where the data sending request includes an identity of the first virtual machine and a PFN of the memory data that is requested to be sent; and the host queries a correspondence information base according to the identity of the first virtual machine to obtain a correspondence of the first virtual machine, where the correspondence information base includes a correspondence of a virtual machine to be migrated, and the correspondence of the virtual machine is a correspondence established between a PFN and a physical memory page address of memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine; therefore, the host is capable of querying the correspondence of the first virtual machine according to the PFN of the memory data that is requested to be sent, so as to obtain a physical memory page address of the memory data that is requested to be sent, and sending, to a destination physical host by using an RDMA network adapter, memory data stored at the physical memory page address of the memory data that is requested to be sent. In this way, in a process of virtual machine migration, it is unnecessary to map memory of a virtual machine to a user-mode space and to update a page table by using a hypercall; a physical memory page address corresponding to memory data that is requested to be sent can be directly obtained by querying according to a correspondence of the virtual machine to be migrated and a PFN in a data sending request, thereby greatly reducing a utilization rate and time overhead of a processor in a physical host on which the virtual machine is located, and resolving, to some extent, a problem of a high utilization rate and high time overhead of the processor in the physical host on which the virtual machine is located in the prior art due to the need, in a process of virtual machine migration on a virtualization platform, of mapping memory of a virtual machine to a user-mode space and updating, by using a hypercall, a page table.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 4 is a schematic diagram of a data sending request queue according to an embodiment of the present invention;

DETAILED DESCRIPTION

Figure 1:
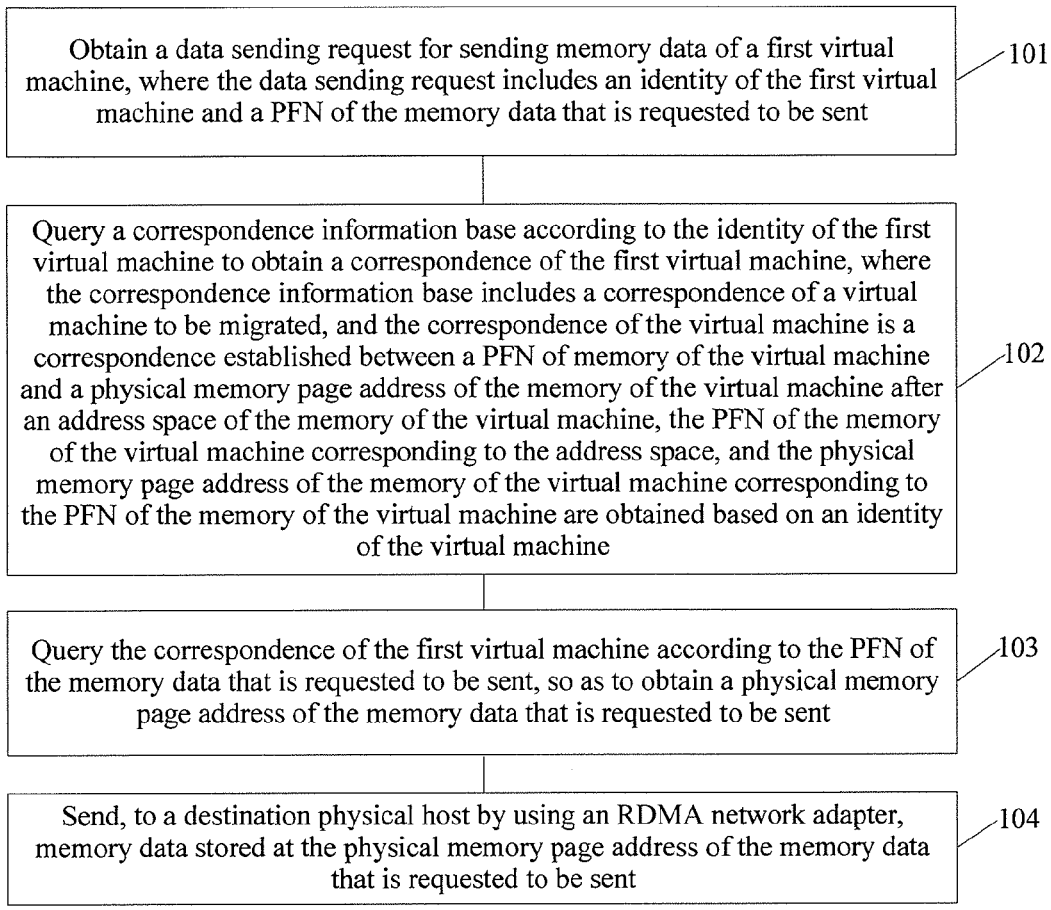
FIG. 1 is a schematic flowchart of a method for migrating memory data of a virtual machine according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

For a better understanding of the embodiments of the present invention, several terms that are introduced in descriptions of the embodiments of the present invention are first described in this part.

Virtual machine VM: One or more virtual computers may be simulated on one physical host by using virtual machine software, and these virtual machines work as real computers, where operating systems and applications may be installed on the virtual machines, and the virtual machines may also access network resources. For an application running on a virtual machine, the virtual machine works as if it is on a real computer.

Hardware layer: A hardware platform on which a virtualization environment runs. The hardware layer may include multiple types of hardware. For example, a hardware layer of a physical host may include a processor (for example, a CPU) and a memory, and may further include high-speed/low-speed input/output (I/O) devices such as a network adapter (for example, an RDMA network adapter) and a storage, and another device having a specified processing function.

Host: A host is used as a management layer to complete management and allocation of hardware resources, present a virtualization hardware platform to a virtual machine, and implement scheduling and isolation of virtual machines. The host may be a virtual machine monitor (VMM). In addition, a VMM sometimes cooperates with one privileged virtual machine, and the two form a host in combination. The virtualization hardware platform provides various hardware resources for each virtual machine running on the virtualization hardware platform, for example, provides a virtual processor (for example, a VCPU), a virtual memory, a virtual disk, a virtual network adapter, and the like. The virtual disk may correspond to one file or one logical block device of the host. A virtual machine runs on a virtualization hardware platform that is provided by the host for the virtual machine, and one or more virtual machines run on the host.

Privileged virtual machine: A special virtual machine, which may also be referred to as a drive domain. For example, this special virtual machine is referred to as Dom0 on a Xen Hypervisor platform. Drive programs of real physical devices such as a network adapter and a SCSI disk are installed on this virtual machine, which can detect and directly access these real physical devices. Other virtual machines use a corresponding mechanism provided by the Hypervisor to access the real physical devices through the privileged virtual machine.

It should be understood that the embodiments of the present invention may be applied to a Xen virtualization platform, and may also be applied to any virtualization platform that requires mapping of memory of a virtual machine when the virtual machine is migrated, which is not limited in the embodiments of the present invention.

Embodiment 1

Refer to FIG. 1, which shows a method for migrating memory data of a virtual machine according to an embodiment of the present invention. As shown in FIG. 1, the following steps may be included:

101: Obtain a data sending request for sending memory data of a first virtual machine, where the data sending request includes an identity of the first virtual machine and a PFN of the memory data that is requested to be sent.

The method provided by this embodiment of the present invention may be executed by a physical host on which the first virtual machine is located, for example, may be executed by a host on the physical host, where the host is a combination of a VMM and a privileged virtual machine running on the VMM. The data sending request is sent by a user process on the privileged virtual machine to the privileged virtual machine. An identity of a virtual machine may be any parameter that can uniquely identify the virtual machine, for example, may be a domain name of the virtual machine.

102: Query a correspondence information base according to the identity of the first virtual machine to obtain a correspondence of the first virtual machine, where the correspondence information base includes a correspondence of a virtual machine to be migrated, and the correspondence of the virtual machine is a correspondence established between a PFN of memory of the virtual machine and a physical memory page address of the memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine.

103: Query the correspondence of the first virtual machine according to the PFN of the memory data that is requested to be sent, so as to obtain a physical memory page address of the memory data that is requested to be sent.

104: Send, to a destination physical host by using a remote direct memory access RDMA network adapter, memory data stored at the physical memory page address of the memory data that is requested to be sent.

Optionally, before the obtaining a data sending request for sending memory data of a first virtual machine, the method further includes:

obtaining a migration request that is triggered by a user process of a privileged virtual machine and used for migrating the memory data of the first virtual machine, where the migration request includes the identity of the first virtual machine;

obtaining an address space of memory of the first virtual machine according to the identity of the first virtual machine in the migration request;

obtaining a PFN of the memory of the first virtual machine according to the address space;

calculating a physical memory page address of the memory of the first virtual machine according to the PFN of the memory of the first virtual machine; and establishing a correspondence between the PFN of the memory of the first virtual machine and the physical memory page address of the memory of the first virtual machine.

Further, the method further includes a process of registering the physical memory page address of the memory data of the first virtual machine with the RDMA network adapter, which may be specifically implemented in any one of the following two manners:

1. After the calculating a physical memory page address of the memory of the first virtual machine according to the PFN of the memory of the first virtual machine and before the obtaining a data sending request for sending memory data of a first virtual machine, register the physical memory page address of the memory of the first virtual machine with the RDMA network adapter.

In this manner, physical memory page addresses of all memory of the first virtual machine are registered with the RDMA network adapter at a time. For example, the physical memory page addresses corresponding to all memory of the first virtual machine are 0x00010000 to 0x0001ffff; and correspondingly, 0x00010000 to 0x0001ffff are all registered with the RDMA network adapter at a time.

2. After the querying the correspondence of the first virtual machine according to the PFN of the memory data that is requested to be sent, so as to obtain a physical memory page address of the memory data that is requested to be sent, and before the sending, to a destination physical host by using an RDMA network adapter, memory data stored at the physical memory page address of the memory data that is requested to be sent, register, with the RDMA network adapter, the physical memory page address of the memory data that is requested to be sent.

In this manner, physical memory page addresses of memory data that is requested by each data sending request to send are separately registered with the RDMA network adapter in batches according to each data sending request. For example, physical memory page addresses corresponding to all memory of the first virtual machine are 0x00010000 to 0x0001ffff, and physical memory page addresses of memory data that is requested by a first data sending request to send are 0x00010000 to 0x000100ff; and correspondingly, after the first data sending request is obtained and before memory data stored at the physical memory page addresses 0x00010000 to 0x000100ff is sent to a destination physical host by using the RDMA network adapter, the physical memory page addresses 0x00010000 to 0x000100ff are registered with the RDMA network adapter. For another example, physical memory page addresses of memory data that is requested by a second data sending request to send are 0x00010100 to 0x000101ff; and correspondingly, after the second data sending request is obtained and before memory data stored at the physical memory page addresses 0x00010100 to 0x000101ff is sent to a destination physical host by using the RDMA network adapter, the physical memory page addresses 0x00010100 to 0x000101ff are registered with the RDMA network adapter.

According to the method for migrating memory data of a virtual machine in this embodiment of the present invention, a data sending request for sending memory data of a first virtual machine is obtained, where the data sending request includes an identity of the first virtual machine and a PFN of the memory data that is requested to be sent; a correspondence information base is queried according to the identity of the first virtual machine to obtain a correspondence of the first virtual machine, where the correspondence information base includes a correspondence of a virtual machine to be migrated, and the correspondence of the virtual machine is a correspondence established between a PFN and a physical memory page address of memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine; therefore, the correspondence of the first virtual machine can be queried according to the PFN of the memory data that is requested to be sent, so as to obtain a physical memory page address of the memory data that is requested to be sent; and memory data stored at the physical memory page address of the memory data that is requested to be sent is then sent to a destination physical host by using an RDMA network adapter. In this way, in a process of virtual machine migration, it is unnecessary to map memory of a virtual machine to a user-mode space and to update a page table by using a hypercall; a physical memory page address corresponding to memory data that is requested to be sent can be directly obtained by querying according to a correspondence of the virtual machine to be migrated and a PFN in a data sending request, thereby greatly reducing a utilization rate and time overhead of a processor in a physical host on which the virtual machine is located, and resolving, to some extent, a problem of a high utilization rate and high time overhead of the processor in the physical host on which the virtual machine is located in the prior art due to the need, in a process of virtual machine migration on a virtualization platform, of mapping memory of a virtual machine to a user-mode space and updating, by using a hypercall, a page table.

The following describes the foregoing method embodiment by using specific embodiments.

Figure 2:
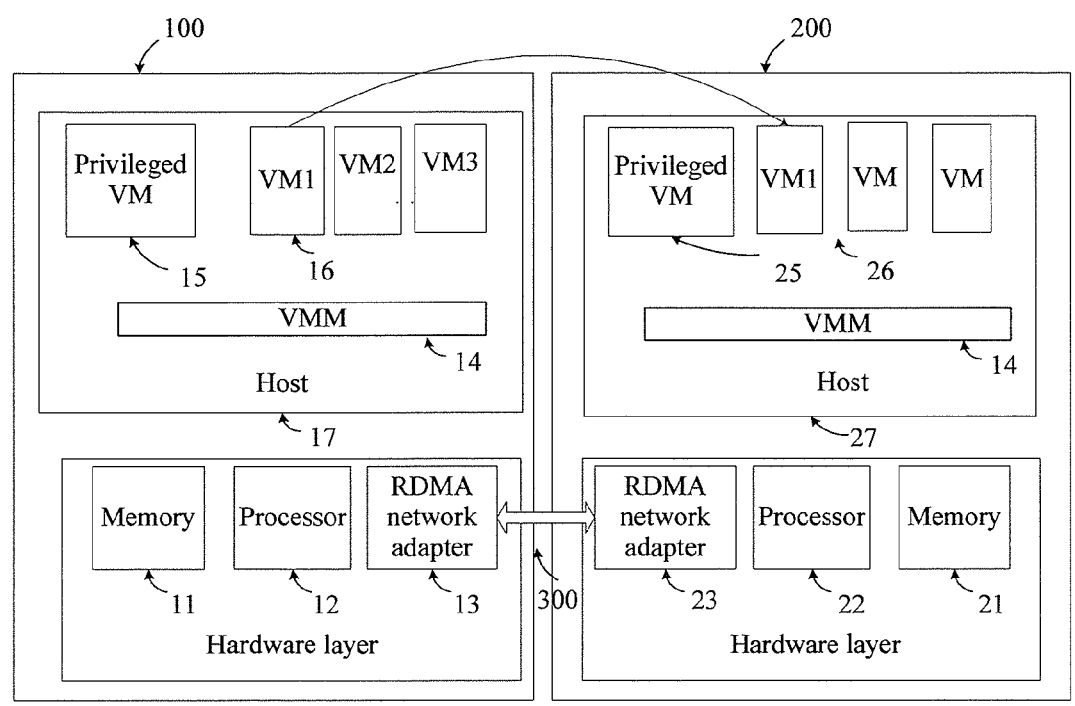
FIG. 2 is a schematic diagram of an application scenario according to an embodiment of the present invention.

The method for migrating memory data of a virtual machine in this embodiment of the present invention may be applied to a cluster system, where the cluster system includes a plurality of physical hosts, the plurality of physical hosts include a source physical host and a destination physical host. Each physical host includes a hardware layer, a host running on the hardware layer, and at least one virtual machine VM running on the host, and the hardware layer includes an RDMA network adapter, a processor, and a memory. Refer to FIG. 2, which shows an application scenario that is set in this embodiment of the present invention for a cluster system. The following specific embodiments are specifically described in this scenario. The application scenario includes two physical hosts 100 and 200, and a dedicated optical cable 300. Hardware layers of the two physical hosts 100 and 200 include RDMA network adapters 13 and 23, processors 12 and 22, and memories 11 and 21, respectively, where the memory 11 and the memory 21 may be a shared memory, and the RDMA network adapters 13 and 23 may be wireless InfiniBand network adapters, Ethernet (RDMA over Converged Ethernet, RoCE for short) network adapters, or the like. Hosts 17 and 27 run on the hardware layers of the physical hosts 100 and 200, respectively, where the host 17 is formed, in combination, by a VMM 14 and a privileged virtual machine 15 running on the VMM 14 and the host 27 is formed, in combination, by a VMM 24 and a privileged virtual machine 25 running on the VMM 24, at least one virtual machine 16 and at least one virtual machine 26 run on the VMMs 14 and 24, respectively, and the virtual machines are virtual machines other than the privileged virtual machines. Network adapter drivers corresponding to the RDMA network adapters 13 and 23 are loaded on the privileged virtual machines 15 and 25, respectively.

The dedicated optical cable 300 is used to connect the RDMA network adapters on the two physical hosts, and the dedicated optical cable 300 may be a quad SFP (Quad Small Form-factor Pluggable, QSPF for short) interface, or an optical cable of another model, which is not limited in this embodiment of the present invention. The shared storage may be a storage area network (SAN), an Internet Small Computer System Interface (iSCSI), or a network attached storage (NAS), which is not limited in this embodiment of the present invention. A specific scenario is to migrate the virtual machine 16 on the physical host 100 (source physical host) to the physical host 200 (destination physical host). In this embodiment of the present invention, only a virtual machine migration portion of virtual machine live migration is described in detail.

Embodiment 2

Figure 3:
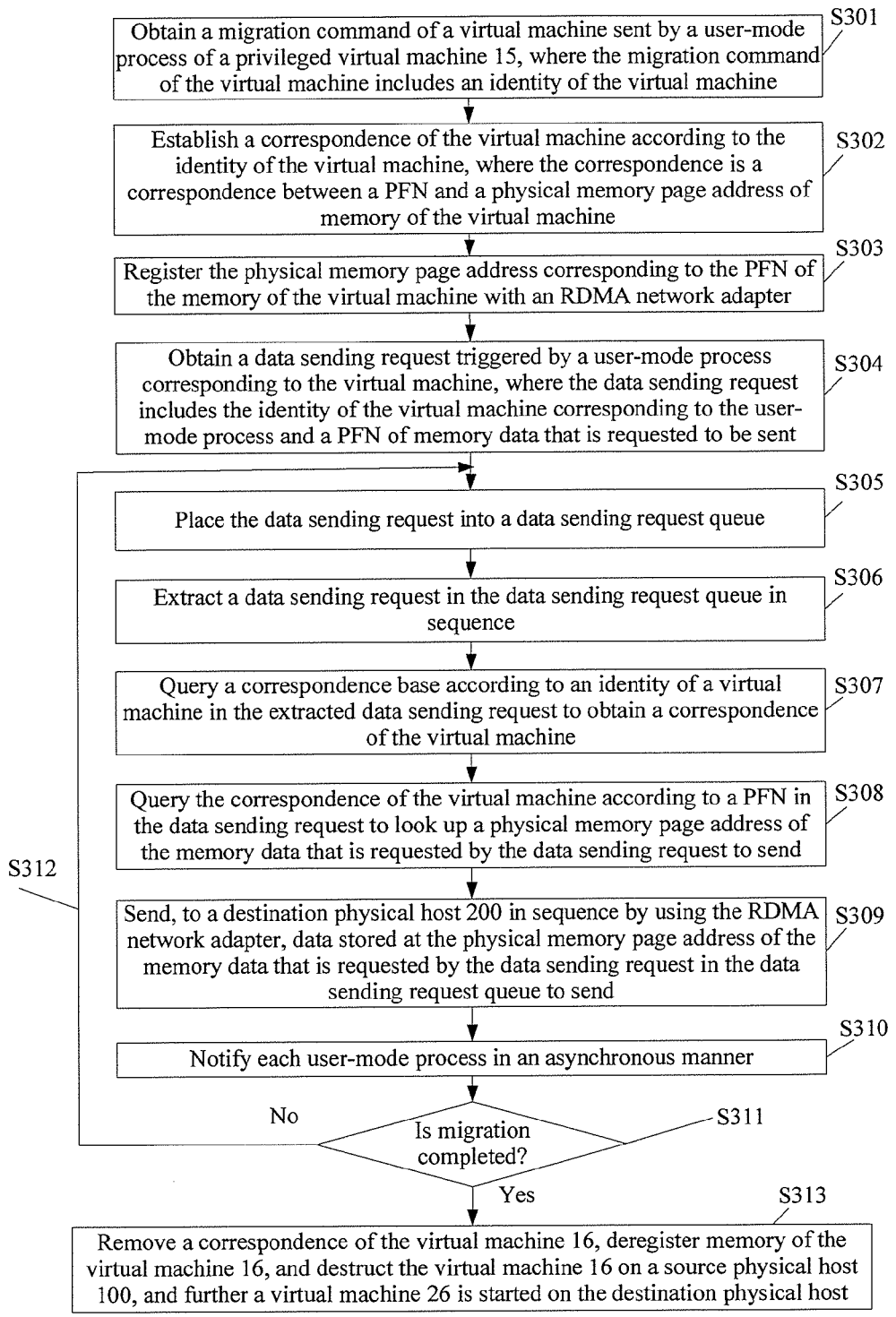
FIG. 3 is a schematic flowchart of another method for migrating memory data of a virtual machine according to an embodiment of the present invention.

Refer to FIG. 3, which shows another method for migrating memory data of a virtual machine according to an embodiment of the present invention. The method may be executed by a physical host 100, for example, may be executed by a host 17 running on the physical host 100. As shown in FIG. 3, the following steps may be included:

S301: Obtain a migration request of a virtual machine sent by a user process of a privileged virtual machine 15, where the migration command of the virtual machine includes an identity of the virtual machine.

Exemplarily, there may be one or more virtual machines, which is not limited in this embodiment of the present invention; however, the virtual machines are located on a same source physical host.

Exemplarily, a network adapter driver corresponding to an RDMA network adapter 13 is loaded and all RDMA communications interfaces are encapsulated on the privileged virtual machine 15 on the host 17, where each RDMA communications interface is used for interaction between user space and kernel space within the privileged virtual machine, and one RDMA communications interface corresponds to one virtual machine. For example, there are three virtual machines, which are a virtual machine 1, a virtual machine 2, and a virtual machine 3, where the virtual machine 1 corresponds to an RDMA communications interface 1, the virtual machine 2 corresponds to an RDMA communications interface 2, and the virtual machine 3 corresponds to an RDMA communications interface 3; and the RDMA communications interface 1, the RDMA communications interface 2, and the RDMA communications interface 3 are all encapsulated within the network adapter driver of the privileged virtual machine. The RDMA communications interfaces are used to create a protected domain, a queue pair, and the like.

Exemplarily, one user process corresponds to one virtual machine. For example, there are three virtual machines, which are a virtual machine 1, a virtual machine 2, and a virtual machine 3, where the virtual machine 1 corresponds to an RDMA communications interface 1 and a user process 1, the virtual machine 2 corresponds to an RDMA communications interface 2 and a user process 2, and the virtual machine 3 corresponds to an RDMA communications interface 3 and a user process 3; the RDMA communications interface 1, the RDMA communications interface 2, and the RDMA communications interface 3 are all encapsulated within the privileged virtual machine 15; and the RDMA communications interface 1, the RDMA communications interface 2, and the RDMA communications interface 3 within the privileged virtual machine 15 receive commands for migrating the virtual machine 1, the virtual machine 2, and the virtual machine 3, respectively, where the commands are sent by the user process 1, the user process 2, and the user process 3, respectively.

Exemplarily, the identity (IDentity, ID for short) of a virtual machine may be a domain name of the virtual machine, or may be another identity that can uniquely represent the virtual machine, which is not limited in this embodiment of the present invention.

S302: Establish a correspondence of the virtual machine according to the identity of the virtual machine, where the correspondence is a correspondence between a PFN and a physical memory page address of memory of the virtual machine.

Exemplarily, a VMM 14 in the host 17 may: obtain an address space of the memory of the virtual machine according to the identity of the virtual machine in the migration request;

obtain the PFN of the memory of the virtual machine according to the address space;

calculate the physical memory page address of the memory of the virtual machine according to the PFN of the memory of the virtual machine; and establish the correspondence between the PFN of the memory of the virtual machine and the physical memory page address of the memory of the virtual machine.

Exemplarily, for example, if a virtual machine 1, a virtual machine 2, and a virtual machine 3 corresponds to a domain ID of a virtual machine each, the VMM 14 in the host 17 may query, according to the domain ID of the virtual machine 1, an address space corresponding to the virtual machine 1, and further obtain a PFN corresponding to the virtual machine 1, and it is assumed that a range of the PFN of the virtual machine 1 is 0 to 65535; the VMM 14 calculates, according to the PFN of the virtual machine 1, a physical memory page address corresponding to the virtual machine 1, and it is assumed that a range of the physical memory page address of the virtual machine 1 is 0x00010000 to 0x0001ffff; and based on this, the host 17 may establish a correspondence between the PFN and the physical memory page address. Similar operations may be performed for the virtual machine 2 and the virtual machine 3.

The correspondence of the virtual machine may be in a form of a relationship table in which the PFN and physical memory page address of the memory of the virtual machine are in a one-to-one correspondence, or may be in any other form that can include the correspondence between the PFN and physical memory page address of the memory of the virtual machine, which is not limited in this embodiment of the present invention.

S303: Register the physical memory page address corresponding to the PFN of the memory of the virtual machine with an RDMA network adapter.

Physical memory page addresses of all memory of the virtual machine may be registered with the RDMA network adapter according to the physical memory page address of the memory of the virtual machine obtained in the process of establishing the correspondence of the virtual machine in S302; alternatively, a correspondence information base may be queried according to the identity of the virtual machine to obtain the correspondence of the virtual machine, then the physical memory page address corresponding to the PFN of the memory of the virtual machine are looked up according to the correspondence, and then physical memory page addresses of all memory of the virtual machine are registered with the RDMA network adapter, where the correspondence information base may include a correspondence of each virtual machine to be migrated.

For example, the correspondence information base is queried according to an identity of a virtual machine 1 to obtain a correspondence of the virtual machine 1, the correspondence of the virtual machine 1 is queried according to a PFN of memory of the virtual machine 1 to obtain a physical memory page address of the memory of the virtual machine 1, and the physical memory page address of the memory of the virtual machine 1 is registered with the RDMA network adapter.

Exemplarily, if there are more quantities of more virtual machines to be migrated, physical memory page addresses of memory of all virtual machines may be separately registered with the RDMA network adapter 13.

S304: Obtain a data sending request triggered by a user process corresponding to the virtual machine, where the data sending request includes the identity of the virtual machine corresponding to the user process and a PFN of memory data that is requested to be sent.

For example, if there are three user processes, which separately request sending of a part of memory data of a virtual machine 1, a virtual machine 2, and a virtual machine 3, a data sending request 1 sent by a user process 1 corresponding to a virtual machine 1, a data sending request 2 sent by a user process 2 corresponding to a virtual machine 2, and a data sending request 3 sent by a user process 3 corresponding to a virtual machine 3 are received.

The data sending request 1 includes an identity of the virtual machine 1 and a PFN of the memory data of the virtual machine 1, which is requested by the user process 1 to send; the data sending request 2 includes an identity of the virtual machine 2 and a PFN of the memory data of the virtual machine 2, which is requested by the user process 2 to send; and the data sending request 3 includes an identity of the virtual machine 3 and a PFN of the memory data of the virtual machine 3, which is requested by the user process 3 to send.

Exemplarily, if there are more quantities of virtual machines to be migrated, a data sending request sent by a user process corresponding to each virtual machine is obtained, where each user process manages migration of memory data of a corresponding virtual machine.

S305: Place the data sending request into a data sending request queue.

Optionally, data sending requests may be placed into the data sending request queue according to a sequence of time when the data sending requests are obtained. For example, as shown in FIG. 4, FIG. 4 is a schematic diagram of a data sending request queue provided by this embodiment of the present invention. As shown in the figure, if a data sending request 1, a data sending request 2, and a data sending request 3 are obtained in sequence, the data sending request 1 sent by a user process 1 is placed into the data sending request queue first; then, the data sending request 2 sent by a user process 2 is placed into the data sending request queue following the data sending request 1; and then, the data sending request 3 sent by a user process 3 is placed into the data sending request queue following the data sending request 2.

Optionally, the data sending request may be placed into the data sending request queue according to a priority of the obtained data sending request. For example, if three data sending requests are obtained, which are a data sending request 1, a data sending request 2, and a data sending request 3 in descending order of priority, the data sending request 1 sent by a user process 1 is placed into the data sending request queue first; then, the data sending request 2 sent by a user process 2 is placed into the data sending request queue following the data sending request 1; and then, the data sending request 3 sent by a user process 3 is placed into the data sending request queue following the data sending request 2.

Certainly, if there are more quantities of virtual machines, a data sending request sent by a user process corresponding to each virtual machine may be placed into a data sending request queue in sequence by using the foregoing manners.

S306: Extract a data sending request in the data sending request queue in sequence.

For example, as shown in FIG. 4, a data sending request 1 is extracted from the data sending request queue first, then a data sending request 2 is extracted, and finally, a data sending request 3 is extracted.

S307: Query a correspondence information base according to an identity of a virtual machine in the extracted data sending request to obtain a correspondence of the virtual machine.

S308: Query the correspondence of the virtual machine according to a PFN in the data sending request to look up a physical memory page address of the memory data that is requested by the data sending request to send.

S309: Send, to a destination physical host 200 in sequence by using the RDMA network adapter, data stored at the physical memory page address of the memory data that is requested by the data sending request in the data sending request queue to send.

S310: Notify each user process in an asynchronous manner.

For example, after memory data of a data sending request 1 is sent completely by using the RDMA network adapter, a user process 1 corresponding to the data sending request 1 is notified in an asynchronous manner; after memory data of a data sending request 2 is sent completely by using the RDMA network adapter, a user process 2 corresponding to the data sending request 2 is notified; and after memory data of a data sending request 3 is sent completely by using the RDMA network adapter, a user process 3 corresponding to the data sending request 3 is notified in an asynchronous manner.

S311: Determine whether memory data of a virtual machine 16 is completely sent to the destination physical host 200; if no, execute step 312; and if yes, execute step 313.

S312: Execute steps S305 to S311 in sequence.

In the foregoing data sending process, data may be sent in an iteration manner, so as to ensure that the virtual machine 16 runs normally in a migration process.

S313: Remove a correspondence of the virtual machine 16, deregister memory of the virtual machine 16, and destruct the virtual machine 16 on a source physical host 100; and further, a virtual machine 26 is started on the destination physical host 200.

Now, the process of migrating the virtual machine 16 from the source physical host 100 to the destination physical host 200 is complete.

As can be seen from the above, in this embodiment of the present invention, a migration command of a virtual machine sent by a user process of a privileged virtual machine is obtained, and a correspondence between a PFN and a physical memory page address of memory of each virtual machine is established according to an identity of each virtual machine included in a migration command of each virtual machine; the physical memory page address corresponding to the PFN of the memory of each virtual machine can be obtained according to the correspondence of each virtual machine, and the physical memory page address of each virtual machine is registered with an RDMA network adapter; and memory data stored at a physical memory page address of memory data that is requested to be sent is then sent to a destination physical host by using the RDMA network adapter. In this way, in a process of virtual machine migration, it is unnecessary to map memory of a virtual machine to a user-mode space and to update a page table by using a hypercall; a physical memory page address corresponding to memory data that is requested to be sent can be directly obtained by querying according to a correspondence of the virtual machine to be migrated and a PFN in a data sending request, thereby greatly reducing a utilization rate and time overhead of a processor in a physical host on which the virtual machine is located, and resolving, to some extent, a problem of a high utilization rate and high time overhead of the processor in the physical host on which the virtual machine is located in the prior art due to the need, in a process of virtual machine migration on a virtualization platform, of mapping memory of a virtual machine to a user-mode space and updating, by using a hypercall, a page table.

Moreover, because a physical memory page address of each virtual machine is registered with the RDMA network adapter at a time before the RDMA network adapter sends data, it can be ensured that the RDMA network adapter successfully transmits related data according to the data sending request sent by the user process; and further, an obtained data sending request of a user process corresponding to each virtual machine can be uniformly managed by using a data sending request queue, which can implement setting of different priorities for data migration of different user processes, thereby optimizing QoS for different services and improving performance of virtual machine migration.

Embodiment 3

Figure 5:
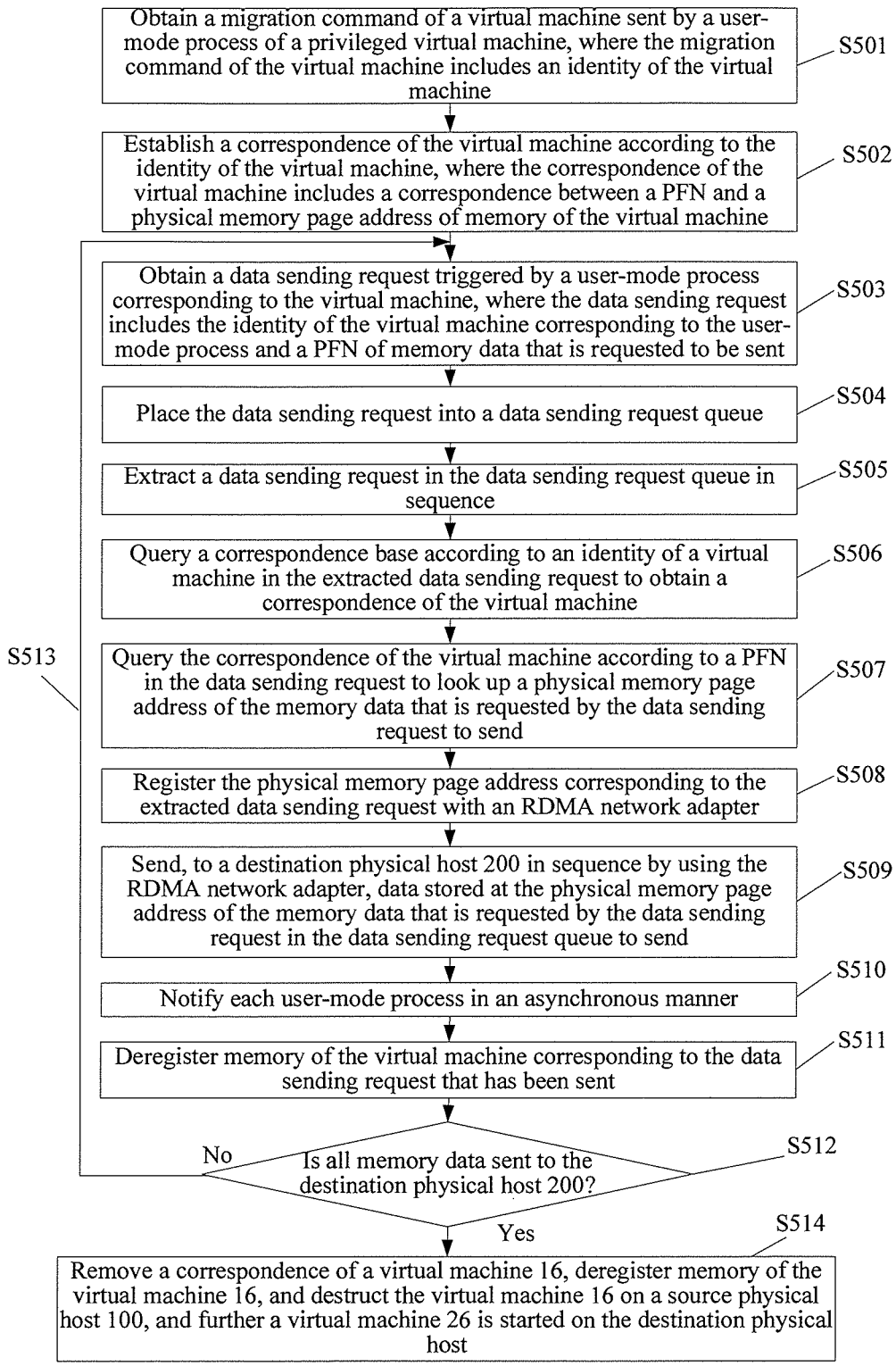
FIG. 5 is a schematic flowchart of still another method for migrating memory data of a virtual machine according to an embodiment of the present invention.

Refer to FIG. 5, which shows another method for migrating a virtual machine according to an embodiment of the present invention. The method may be executed by a physical host 100, for example, may be executed by a host 17 running on the physical host 100. As shown in FIG. 5, the following steps may be included:

S501: Obtain a migration command of a virtual machine sent by a user process of a privileged virtual machine, where the migration command of the virtual machine includes an identity of the virtual machine.

Exemplarily, there may be one or more virtual machines, which is not limited in this embodiment of the present invention; however, the virtual machines are located on a same source physical host.

Exemplarily, a network adapter driver corresponding to an RDMA network adapter 13 is loaded and all RDMA communications interfaces are encapsulated on the privileged virtual machine 15 on the host 17, where each RDMA communications interface is used for interaction between user space and kernel space within the privileged virtual machine, and one RDMA communications interface corresponds to one virtual machine. For example, there are three virtual machines, which are a virtual machine 1, a virtual machine 2, and a virtual machine 3, where the virtual machine 1 corresponds to an RDMA communications interface 1, the virtual machine 2 corresponds to an RDMA communications interface 2, and the virtual machine 3 corresponds to an RDMA communications interface 3; and the RDMA communications interface 1, the RDMA communications interface 2, and the RDMA communications interface 3 are all encapsulated within the network adapter driver of the privileged virtual machine. The RDMA communications interfaces are used to create a protected domain, a queue pair, and the like.

Exemplarily, one user process corresponds to one virtual machine. For example, there are three virtual machines, which are a virtual machine 1, a virtual machine 2, and a virtual machine 3, where the virtual machine 1 corresponds to an RDMA communications interface 1 and a user process 1, the virtual machine 2 corresponds to an RDMA communications interface 2 and a user process 2, and the virtual machine 3 corresponds to an RDMA communications interface 3 and a user process 3; the RDMA communications interface 1, the RDMA communications interface 2, and the RDMA communications interface 3 are all encapsulated within the privileged virtual machine 15; and the RDMA communications interface 1, the RDMA communications interface 2, and the RDMA communications interface 3 within the privileged virtual machine 15 receive commands for migrating the virtual machine 1, the virtual machine 2, and the virtual machine 3, respectively, where the commands are sent by the user process 1, the user process 2, and the user process 3, respectively.

Exemplarily, the identity (IDentity, ID for short) of a virtual machine may be a domain name of the virtual machine, or may be another identity that can uniquely represent the virtual machine, which is not limited in this embodiment of the present invention.

S502: Establish a correspondence of the virtual machine according to the identity of the virtual machine, where the correspondence of the virtual machine includes a correspondence between a PFN and a physical memory page address of memory of the virtual machine.

Exemplarily, a VMM 14 in the host 17 may: obtain an address space of the memory of the virtual machine according to the identity of the virtual machine in the migration request;

obtain the PFN of the memory of the virtual machine according to the address space;

calculate the physical memory page address of the memory of the virtual machine according to the PFN of the memory of the virtual machine; and establish the correspondence between the PFN of the memory of the virtual machine and the physical memory page address of the memory of the virtual machine.

Exemplarily, for example, if a virtual machine 1, a virtual machine 2, and a virtual machine 3 corresponds to a domain ID of a virtual machine each, the VMM 14 in the host 17 may query, according to the domain ID of the virtual machine 1, an address space corresponding to the virtual machine 1, and further obtain a PFN corresponding to the virtual machine 1, and it is assumed that a range of the PFN of the virtual machine 1 is 0 to 65535; the VMM 14 calculates, according to the PFN of the virtual machine 1, a physical memory page address corresponding to the virtual machine 1, and it is assumed that a range of the physical memory page address of the virtual machine 1 is 0x00010000 to 0x0001ffff; and based on this, the host 17 may establish a correspondence between the PFN and the physical memory page address. Similar operations may be performed for the virtual machine 2 and the virtual machine 3.

The correspondence of the virtual machine may be in a form of a relationship table in which the PFN and physical memory page address of the memory of the virtual machine are in a one-to-one correspondence, or may be in any other form that can include the correspondence between the PFN and physical memory page address of the memory of the virtual machine, which is not limited in this embodiment of the present invention.

S503: Obtain a data sending request triggered by a user process corresponding to the virtual machine, where the data sending request includes the identity of the virtual machine corresponding to the user process and a PFN of memory data that is requested to be sent.

For example, if there are three user processes, which separately request sending of a part of memory data of a virtual machine 1, a virtual machine 2, and a virtual machine 3, a data sending request 1 triggered by a user process 1 corresponding to a virtual machine 1, a data sending request 2 triggered by a user process 2 corresponding to a virtual machine 2, and a data sending request 3 triggered by a user process 3 corresponding to a virtual machine 3 are obtained.

The data sending request 1 includes an identity of the virtual machine 1 and a PFN of the memory data of the virtual machine 1, which is requested by the user process 1 to send; the data sending request 2 includes an identity of the virtual machine 2 and a PFN of the memory data of the virtual machine 2, which is requested by the user process 2 to send; and the data sending request 3 includes an identity of the virtual machine 3 and a PFN of the memory data of the virtual machine 3, which is requested by the user process 3 to send.

Exemplarily, if there are more quantities of virtual machines to be migrated, a data sending request triggered by a user process corresponding to each virtual machine is obtained, where each user process manages migration of memory data of a corresponding virtual machine.

S504: Place the data sending request into a data sending request queue.

Optionally, data sending requests may be placed into the data sending request queue according to a sequence of time when the data sending requests are obtained. For example, as shown in FIG. 4, FIG. 4 is a schematic diagram of a data sending request queue provided by this embodiment of the present invention. As shown in the figure, if a data sending request 1, a data sending request 2, and a data sending request 3 are obtained in sequence, the data sending request 1 sent by a user process 1 is placed into the data sending request queue first; then, the data sending request 2 sent by a user process 2 is placed into the data sending request queue following the data sending request 1; and then, the data sending request 3 sent by a user process 3 is placed into the data sending request queue following the data sending request 2.

Optionally, the data sending request may be placed into the data sending request queue according to a priority of the obtained data sending request. For example, if three data sending requests are obtained, which are a data sending request 1, a data sending request 2, and a data sending request 3 in descending order of priority, the data sending request 1 sent by a user process 1 is placed into the data sending request queue first; then, the data sending request 2 sent by a user process 2 is placed into the data sending request queue following the data sending request 1; and then, the data sending request 3 sent by a user process 3 is placed into the data sending request queue following the data sending request 2.

Certainly, if there are more quantities of virtual machines, a data sending request sent by a user process corresponding to each virtual machine may be placed into a data sending request queue in sequence by using the foregoing manners.

S505: Extract a data sending request in the data sending request queue in sequence.

For example, as shown in FIG. 4, a data sending request 1 is extracted from the data sending request queue first, then a data sending request 2 is extracted, and finally, a data sending request 3 is extracted.

S506: Query a correspondence information base according to an identity of a virtual machine in the extracted data sending request to obtain a correspondence of the virtual machine.

S507: Query the correspondence of the virtual machine according to a PFN in the data sending request to look up a physical memory page address of the memory data that is requested by the data sending request to send.

S508: Register the physical memory page address corresponding to the extracted data sending request with an RDMA network adapter.

A physical memory page address corresponding to each data sending request is registered with the RDMA network adapter according to a sequence of extracted data sending requests. For example, the privileged virtual machine 15 extracts a data sending request 1 in a data sending request queue and registers a physical memory page address corresponding to the data sending request 1 with the RDMA network adapter; extracts a data sending request 2 in the data sending request queue and registers a physical memory page address corresponding to the data sending request 2 with the RDMA network adapter; and then, extracts a data sending request 3 in the data sending request queue in sequence and registers a physical memory page address corresponding to the data sending request 3 with the RDMA network adapter.

S509: Send, to a destination physical host 200 in sequence by using the RDMA network adapter, data stored at the physical memory page address of the memory data that is requested by the data sending request in the data sending request queue to send.

S510: Notify each user process in an asynchronous manner.

For example, after memory data of a data sending request 1 is sent completely by using the RDMA network adapter, a user process 1 corresponding to the data sending request 1 is notified in an asynchronous manner; after memory data of a data sending request 2 is sent completely by using the RDMA network adapter, a user process 2 corresponding to the data sending request 2 is notified; and after memory data of a data sending request 3 is sent completely by using the RDMA network adapter, a user process 3 corresponding to the data sending request 3 is notified in an asynchronous manner.

S511: Deregister memory of the virtual machine corresponding to the data sending request that has been sent.

S512: Determine whether all memory data of a virtual machine 16 is sent to the destination physical host 200; if no, execute step 513; and if yes, execute step 514.

S513: Execute steps S503 to S512.

S514: Remove a correspondence of the virtual machine 16, deregister memory of the virtual machine 16, and destruct the virtual machine 16 on a source physical host 100, and further a virtual machine 26 is started on the destination physical host 200.

If migration is complete, the host 17 removes the correspondence of the virtual machine and deregisters the memory of the virtual machine.

Now, the process of migrating the virtual machine 16 from the source physical host 100 to the destination physical host 200 is complete.

As can be seen from the above, in this embodiment of the present invention, a migration command of a virtual machine triggered by a user process of a privileged virtual machine is obtained, and a correspondence between a PFN and a physical memory page address of memory of the virtual machine is established according to an identity of the virtual machine included in the migration command of the virtual machine; the physical memory page address corresponding to the PFN of the memory of the virtual machine can be obtained according to the correspondence of the virtual machine, and the physical memory page address of the virtual machine is registered with an RDMA network adapter before the RDMA network adapter sends data; and memory data stored at a physical memory page address of memory data that is requested to be sent is then sent to a destination physical host by using the RDMA network adapter. In this way, in a process of virtual machine migration, it is unnecessary to map memory of a virtual machine to a user-mode space and to update a page table by using a hypercall; a physical memory page address corresponding to memory data that is requested to be sent can be directly obtained by querying according to a correspondence of the virtual machine to be migrated and a PFN in a data sending request, thereby greatly reducing a utilization rate and time overhead of a processor in a physical host on which the virtual machine is located, and resolving, to some extent, a problem of a high utilization rate and high time overhead of the processor in the physical host on which the virtual machine is located in the prior art due to the need, in a process of virtual machine migration on a virtualization platform, of mapping memory of a virtual machine to a user-mode space and updating, by using a hypercall, a page table.

Moreover, an obtained data sending request of a user process corresponding to each virtual machine can be uniformly managed by using a data sending request queue, which can implement setting of different priorities for data migration of different user processes, thereby optimizing QoS for different services and improving performance of virtual machine migration.

Embodiment 4

Figure 6:
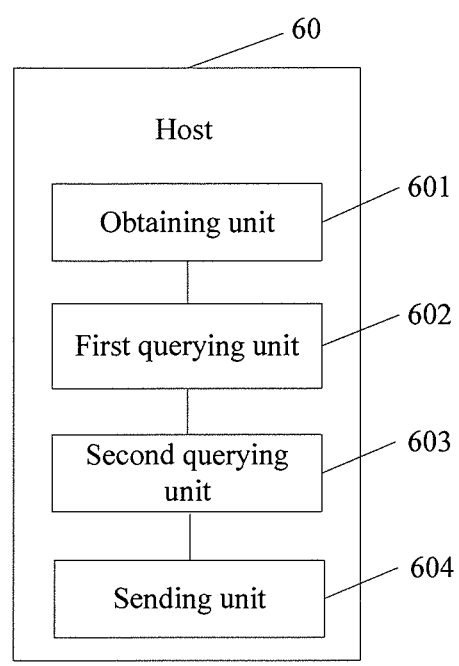
FIG. 6 is a schematic structural diagram of a host according to an embodiment of the present invention.

An embodiment of the present invention provides a host 60, where the host 60 is deployed on a same physical host as a first virtual machine. In an implementation manner, the host 60 may include a privileged virtual machine and a VMM, where the privileged virtual machine and the VMM are deployed on the same physical host as the first virtual machine. Referring to FIG. 6, the host 60 may include:

an obtaining unit 601, configured to obtain a data sending request for sending memory data of a first virtual machine, where the data sending request includes an identity of the first virtual machine and a PFN of the memory data that is requested to be sent;

a first querying unit 602, configured to query a correspondence information base according to the identity of the first virtual machine to obtain a correspondence of the first virtual machine, where the correspondence information base includes a correspondence of a virtual machine to be migrated, and the correspondence of the virtual machine is a correspondence established between a PFN of memory of the virtual machine and a physical memory page address of the memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine;

a second querying unit 603, configured to query the correspondence of the first virtual machine according to the PFN of the memory data that is requested to be sent, so as to obtain a physical memory page address of the memory data that is requested to be sent, where the correspondence of the first virtual machine is obtained by the first querying unit 602; and a driver sending unit 604, configured to send, to a destination physical host by using an RDMA network adapter, memory data stored at the physical memory page address of the memory data that is requested to be sent, where the physical memory page address of the memory data that is requested to be sent is obtained by the second querying unit 603.

According to a host 60 provided by this embodiment of the present invention, the host 60 is capable of obtaining a data sending request for sending memory data of a first virtual machine, where the data sending request includes an identity of the first virtual machine and a PFN of the memory data that is requested to be sent; and the host queries a correspondence information base according to the identity of the first virtual machine to obtain a correspondence of the first virtual machine, where the correspondence information base includes a correspondence of a virtual machine to be migrated, and the correspondence of the virtual machine is a correspondence established between a PFN and a physical memory page address of memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine; therefore, the host is capable of querying the correspondence of the first virtual machine according to the PFN of the memory data that is requested to be sent, so as to obtain a physical memory page address of the memory data that is requested to be sent, and then sending, to a destination physical host by using an RDMA network adapter, memory data stored at the physical memory page address of the memory data that is requested to be sent. In this way, in a process of virtual machine migration, it is unnecessary to map memory of a virtual machine to a user-mode space and to update a page table by using a hypercall; a physical memory page address corresponding to memory data that is requested to be sent can be directly obtained by querying according to a correspondence of the virtual machine to be migrated and a PFN in a data sending request, thereby greatly reducing a utilization rate and time overhead of a processor in a physical host on which the virtual machine is located, and resolving, to some extent, a problem of a high utilization rate and high time overhead of the processor in the physical host on which the virtual machine is located in the prior art due to the need, in a process of virtual machine migration on a virtualization platform, of mapping memory of a virtual machine to a user-mode space and updating, by using a hypercall, a page table.

Embodiment 5

Figure 7:
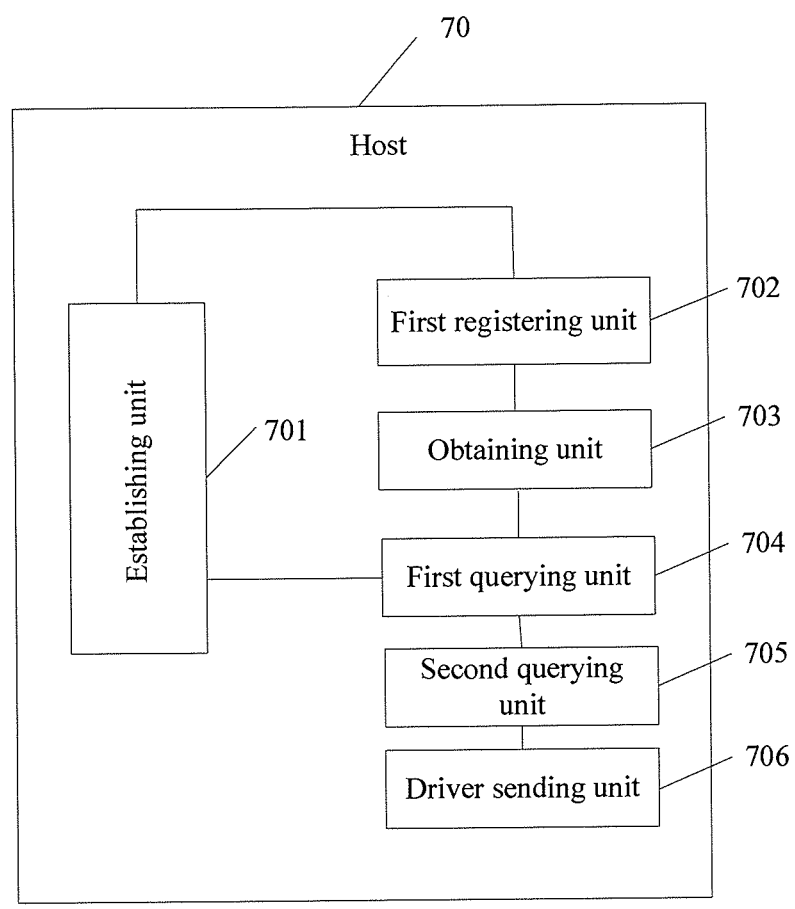
FIG. 7 is a schematic structural diagram of another host according to an embodiment of the present invention.

Refer to FIG. 7, which shows another host 70 provided by an embodiment of the present invention. Referring to FIG. 7, the host 70 includes an establishing unit 701, a first registering unit 702, an obtaining unit 703, a first querying unit 704, a second querying unit 705, and a driver sending unit 706.

For specific functions of the obtaining unit 703, the first querying unit 704, the second querying unit 705, and the driver sending unit 706, refer to the descriptions in Embodiment 4, and details are not described herein again.

The establishing unit 701 is configured to: obtain a migration request that is triggered by a user process of a privileged virtual machine and used for migrating memory data of a first virtual machine, where the migration request includes an identity of the first virtual machine; obtain an address space of memory of the first virtual machine according to the identity of the first virtual machine in the migration request; obtain a PFN of memory of the first virtual machine according to the address space; calculate a physical memory page address of the memory of the first virtual machine according to a PFN of the memory of the first virtual machine; and establish a correspondence between the PFN of the memory of the first virtual machine and the physical memory page address of the memory of the first virtual machine.

The first registering unit 702 is configured to, after the establishing unit 701 calculates the physical memory page address of the memory of the first virtual machine according to the PFN of the memory of the first virtual machine and before the obtaining unit 702 obtains a data sending request for sending the memory data of the first virtual machine, register the physical memory page address of the memory of the first virtual machine with the RDMA network adapter, where the physical memory page address of the memory of the first virtual machine is obtained by the establishing unit 701.

In this embodiment, the first registering unit 702 registers physical memory page addresses of all memory of the first virtual machine with the RDMA network adapter at a time. For example, the physical memory page addresses corresponding to all memory of the first virtual machine are 0x00010000 to 0x0001ffff; and correspondingly, the first registering unit 702 registers all 0x00010000 to 0x0001ffff with the RDMA network adapter at a time.

Further, the obtaining unit 703 is specifically configured to extract data sending requests in a data sending request queue in sequence, where the data sending requests include data sending requests of different virtual machines to be migrated, and the data sending requests in the data sending request queue are sorted according to a sequence of time or priorities.

The host 70 provided by this embodiment of the present invention is configured to obtain a migration command of a virtual machine sent by a user process of a privileged virtual machine, and establish a correspondence between a PFN and a physical memory page address of memory of each virtual machine according to an identity of each virtual machine included in a migration command of each virtual machine; the physical memory page address corresponding to the PFN of the memory of each virtual machine can be obtained according to the correspondence of each virtual machine, and the physical memory page address of each virtual machine is registered with an RDMA network adapter; and memory data stored at a physical memory page address of memory data that is requested to be sent is then sent to a destination physical host by using the RDMA network adapter. In this way, in a process of virtual machine migration, it is unnecessary to map memory of a virtual machine to a user-mode space and to update a page table by using a hypercall; a physical memory page address corresponding to memory data that is requested to be sent can be directly obtained by querying according to a correspondence of the virtual machine to be migrated and a PFN in a data sending request, thereby greatly reducing a utilization rate and time overhead of a processor in a physical host on which the virtual machine is located, and resolving, to some extent, a problem of a high utilization rate and high time overhead of the processor in the physical host on which the virtual machine is located in the prior art due to the need, in a process of virtual machine migration on a virtualization platform, of mapping memory of a virtual machine to a user-mode space and updating, by using a hypercall, a page table.

Moreover, because the first registering unit 702 registers a physical memory page address of each virtual machine with the RDMA network adapter at a time before the drive sending unit 706 sends data by using the RDMA network adapter, it can be ensured that the RDMA network adapter successfully transmits related data according to a data sending request sent by a user process.

Moreover, the obtaining unit 703 is capable of uniformly managing, by using a data sending request queue, an obtained data sending request of a user process corresponding to each virtual machine, which can implement setting of different priorities for data migration of different user processes, thereby optimizing QoS for different services and improving performance of virtual machine migration.

Embodiment 6

Figure 8:
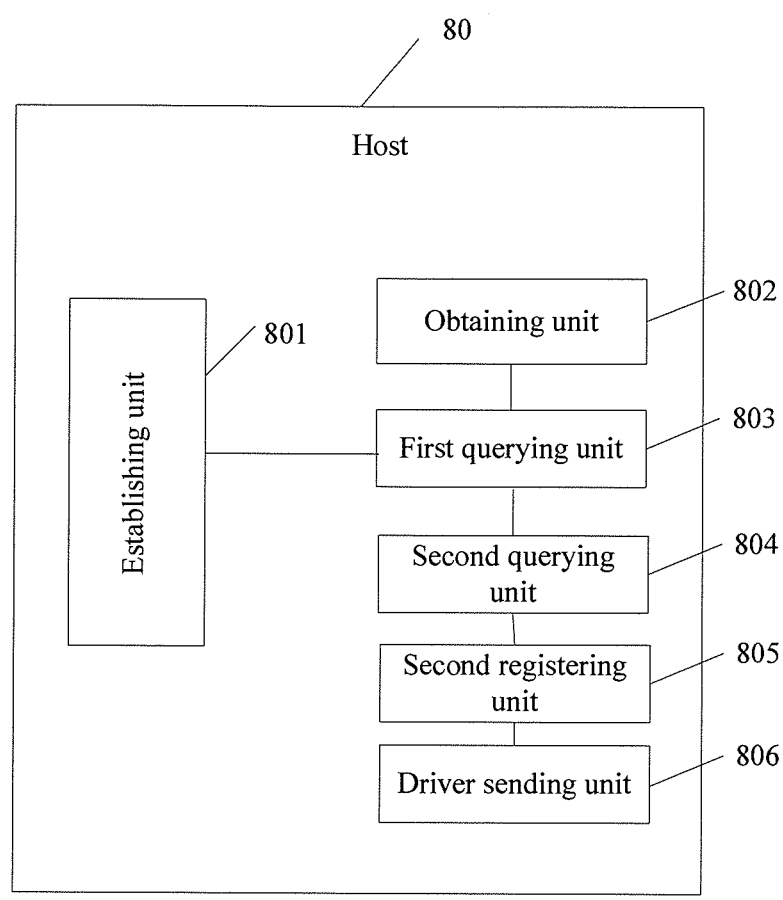
FIG. 8 is a schematic structural diagram of another host according to an embodiment of the present invention.

Refer to FIG. 8, which shows another host 80 provided by an embodiment of the present invention. Referring to FIG. 8, the host 80 includes an establishing unit 801, an obtaining unit 802, a first querying unit 803, a second querying unit 804, a second registering unit 805, and a driver sending unit 806.

The establishing unit 801 is configured to: obtain a migration request that is triggered by a user process of a privileged virtual machine and used for migrating memory data of a first virtual machine, where the migration request includes an identity of the first virtual machine; obtain an address space of memory of the first virtual machine according to the identity of the first virtual machine in the migration request; obtain a PFN of memory of the first virtual machine according to the address space; calculate a physical memory page address of the memory of the first virtual machine according to a PFN of the memory of the first virtual machine; and establish a correspondence between the PFN of the memory of the first virtual machine and the physical memory page address of the memory of the first virtual machine.

The obtaining unit 802 is configured to obtain a data sending request for sending memory data of the first virtual machine, where the data sending request includes the identity of the first virtual machine and a PFN of the memory data that is requested to be sent.

Preferably, the obtaining unit 802 is specifically configured to extract data sending requests in a data sending request queue in sequence, where the data sending requests include data sending requests of different virtual machines to be migrated, and the data sending requests in the data sending request queue are sorted according to a sequence of time or priorities.

The first querying unit 803 is configured to query a correspondence information base according to the identity of the first virtual machine to obtain a correspondence of the first virtual machine, where the correspondence information base includes a correspondence of a virtual machine to be migrated, and the correspondence of the virtual machine is a correspondence established between a PFN of memory of the virtual machine and a physical memory page address of the memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine.

The second querying unit 804 is configured to query the correspondence of the first virtual machine according to the PFN of the memory data that is requested to be sent, so as to obtain a physical memory page address of the memory data that is requested to be sent, where the correspondence of the first virtual machine is obtained by the first querying unit 803.

The second registering unit 805 is configured to register, with an RDMA network adapter, the physical memory page address of the memory data that is requested to be sent, where the physical memory page address of the memory data that is requested to be sent is obtained by the second querying unit 804.

In this embodiment, the second registering unit 805 separately registers, with the RDMA network adapter in batches according to each data sending request, physical memory page addresses of memory data that is requested by each data sending request to send. For example, physical memory page addresses corresponding to all memory of the first virtual machine are 0x00010000 to 0x0001ffff, and physical memory page addresses of memory data that is requested by a first data sending request to send are 0x00010000 to 0x000100ff; and correspondingly, after the first data sending request is obtained and before memory data stored at the physical memory page addresses 0x00010000 to 0x000100ff is sent to a destination physical host by using the RDMA network adapter, the second registering unit 805 registers the physical memory page addresses 0x00010000 to 0x0001ffff with the RDMA network adapter. For another example, physical memory page addresses of memory data that is requested by a second data sending request to send are 0x00010100 to 0x000101ff; and correspondingly, after the second data sending request is obtained and before memory data stored at the physical memory page addresses 0x00010100 to 0x000101ff is sent to a destination physical host by using the RDMA network adapter, the second registering unit 805 registers the physical memory page addresses 0x00010100 to 0x000101ff with the RDMA network adapter.

The driver sending unit 806 is configured to, after the second registering unit 805 registers, with the RDMA network adapter, the physical memory page address of the memory data that is requested to be sent, where the physical memory page address of the memory data that is requested to be sent is obtained by the second querying unit 804, send, to a destination physical host by using the RDMA network adapter, memory data stored at the physical memory page address of the memory data that is requested to be sent, where the physical memory page address of the memory data that is requested to be sent is obtained by the second querying unit 804.

The host 80 provided by this embodiment of the present invention is configured to obtain a migration command of a virtual machine triggered by a user process of a privileged virtual machine, and establish a correspondence between a PFN and a physical memory page address of memory of the virtual machine according to an identity of the virtual machine included in the migration command of the virtual machine; the physical memory page address corresponding to the PFN of the memory of the virtual machine can be obtained according to the correspondence of the virtual machine, and the physical memory page address of the virtual machine is registered with an RDMA network adapter before the RDMA network adapter sends data; and memory data stored at a physical memory page address of memory data that is requested to be sent is then sent to a destination physical host by using the RDMA network adapter. In this way, in a process of virtual machine migration, it is unnecessary to map memory of a virtual machine to a user-mode space and to update a page table by using a hypercall; a physical memory page address corresponding to memory data that is requested to be sent can be directly obtained by querying according to a correspondence of the virtual machine to be migrated and a PFN in a data sending request, thereby greatly reducing a utilization rate and time overhead of a processor in a physical host on which the virtual machine is located, and resolving, to some extent, a problem of a high utilization rate and high time overhead of the processor in the physical host on which the virtual machine is located in the prior art due to the need, in a process of virtual machine migration on a virtualization platform, of mapping memory of a virtual machine to a user-mode space and updating, by using a hypercall, a page table.

Moreover, an obtained data sending request of a user process corresponding to each virtual machine can be uniformly managed by using a data sending request queue, which can implement setting of different priorities for data migration of different user processes, thereby optimizing QoS for different services and improving performance of virtual machine migration.

Moreover, the obtaining unit 703 is capable of uniformly managing, by using a data sending request queue, an obtained data sending request of a user process corresponding to each virtual machine, which can implement setting of different priorities for data migration of different user processes, thereby optimizing QoS for different services and improving performance of virtual machine migration.

Embodiment 7

Figure 9:
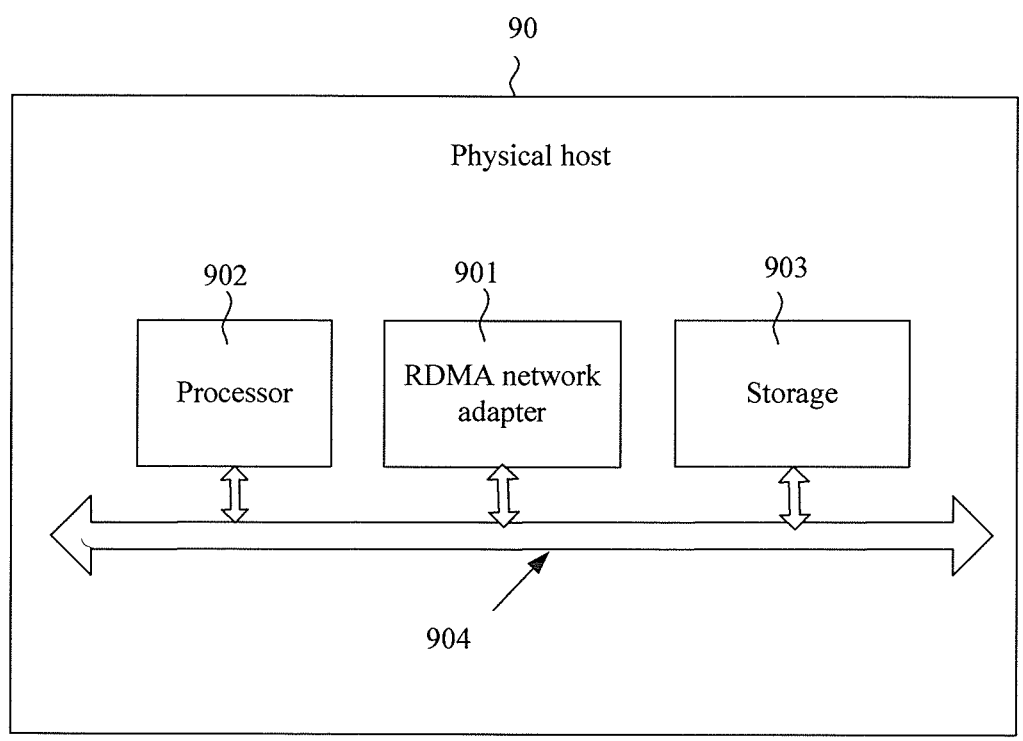
FIG. 9 is an apparatus schematic structural diagram of a physical host according to an embodiment of the present invention.

An embodiment of the present invention provides a physical host 90. Referring to FIG. 9, the physical host 90 includes hardware, where the hardware may include an RDMA network adapter 901. Optionally, the hardware may further include at least one processor 902, a storage 903, and at least one communications bus 904 used to connect devices inside the physical host 90, so as to implement connections and mutual communication between these apparatuses.

The communications bus 904 may be an Industry Standard Architecture (ISA) bus, a Peripheral Component Interconnect (PCI) bus, an Extended Industry Standard Architecture (EISA) bus, or the like. The bus 904 may be classified into an address bus, a data bus, a control bus, and the like. For the convenience of denotation, the bus is represented by using one thick line in FIG. 9; however, it does not indicate that there is only one bus or only one type of bus.

The storage 903 may include a random access memory and provides an instruction and data to the processor 902.

The processor 902 may be a central processing unit (CPU) or an application-specific integrated circuit (ASIC), or be configured as one or more integrated circuits implementing this embodiment of the present invention.

The RDMA network adapter 901 may be various network adapters supporting an RDMA function, for example, may be a wireless InfiniBand network adapter or an Ethernet (RDMA over Converged Ethernet, RoCE for short) network adapter, or the like.

The processor 902 is configured to, by reading an instruction stored by the storage 903:

obtain a data sending request for sending memory data of a first virtual machine, where the data sending request includes an identity of the first virtual machine and a PFN of the memory data that is requested to be sent;

query a correspondence information base according to the identity of the first virtual machine to obtain a correspondence of the first virtual machine, where the correspondence information base includes a correspondence of a virtual machine to be migrated, and the correspondence of the virtual machine is a correspondence established between a PFN of memory of the virtual machine and a physical memory page address of the memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine;

query the obtained correspondence of the first virtual machine according to the PFN of the memory data that is requested to be sent, so as to obtain a physical memory page address of the memory data that is requested to be sent; and send, to a destination physical host by using the RDMA network adapter 901, memory data stored at the obtained physical memory page address of the memory data that is requested to be sent.

Further, the processor 902 is further configured to:

before obtaining the data sending request for sending the memory data of the first virtual machine, obtain a migration request that is triggered by a user process of a privileged virtual machine and used for migrating the memory data of the first virtual machine, where the migration request includes the identity of the first virtual machine;

obtain an address space of memory of the first virtual machine according to the identity of the first virtual machine in the migration request;

obtain a PFN of the memory of the first virtual machine according to the address space;

calculate a physical memory page address of the memory of the first virtual machine according to the PFN of the memory of the first virtual machine; and establish a correspondence between the PFN of the memory of the first virtual machine and the physical memory page address of the memory of the first virtual machine.

Further, the processor 902 is further configured to: register the physical memory page address of the memory data of the first virtual machine with the RDMA network adapter, which may be specifically implemented in any one of the following two manners:

1. After calculating the physical memory page address of the memory of the first virtual machine according to the PFN of the memory of the first virtual machine and before obtaining the data sending request for sending the memory data of the first virtual machine, register the physical memory page address of the memory of the first virtual machine with the RDMA network adapter.

In this manner, the processor 902 registers physical memory page addresses of all memory of the first virtual machine with the RDMA network adapter at a time. For example, the physical memory page addresses corresponding to all memory of the first virtual machine are 0x00010000 to 0x0001ffff; and correspondingly, the host 901 registers all 0x00010000 to 0x0001ffff with the RDMA network adapter at a time.

2. After querying the correspondence of the first virtual machine according to the PFN of the memory data that is requested to be sent, so as to obtain the physical memory page address of the memory data that is requested to be sent, and before sending, to the destination physical host by using the RDMA network adapter, the memory data stored at the physical memory page address of the memory data that is requested to be sent, register, with the RDMA network adapter, the physical memory page address of the memory data that is requested to be sent.

In this manner, the processor 902 registers, with the RDMA network adapter in batches according to each data sending request, physical memory page addresses of memory data that is requested by each data sending request to send. For example, physical memory page addresses corresponding to all memory of the first virtual machine are 0x00010000 to 0x0001ffff, and physical memory page addresses of memory data that is requested by a first data sending request to send are 0x00010000 to 0x000100ff; and correspondingly, after the first data sending request is obtained and before memory data stored at the physical memory page addresses 0x00010000 to 0x000100ff is sent to a destination physical host by using the RDMA network adapter, the processor 902 registers the physical memory page addresses 0x00010000 to 0x0001ffff with the RDMA network adapter. For another example, physical memory page addresses of memory data that is requested by a second data sending request to send are 0x00010100 to 0x000101ff; and correspondingly, after the second data sending request is obtained and before memory data stored at the physical memory page addresses 0x00010100 to 0x000101ff is sent to a destination physical host by using the RDMA network adapter, the host 901 registers the physical memory page addresses 0x00010100 to 0x000101ff with the RDMA network adapter.

The physical host 90 provided by this embodiment of the present invention is capable of obtaining a data sending request for sending memory data of a first virtual machine, where the data sending request includes an identity of the first virtual machine and a PFN of the memory data that is requested to be sent; and the host queries a correspondence information base according to the identity of the first virtual machine to obtain a correspondence of the first virtual machine, where the correspondence information base includes a correspondence of a virtual machine to be migrated, and the correspondence of the virtual machine is a correspondence established between a PFN and a physical memory page address of memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine; therefore, the host is capable of querying the correspondence of the first virtual machine according to the PFN of the memory data that is requested to be sent, so as to obtain a physical memory page address of the memory data that is requested to be sent, and then sending, to a destination physical host by using an RDMA network adapter, memory data stored at the physical memory page address of the memory data that is requested to be. In this way, in a process of virtual machine migration, it is unnecessary to map memory of a virtual machine to a user-mode space and to update a page table by using a hypercall; a physical memory page address corresponding to memory data that is requested to be sent can be directly obtained by querying according to a correspondence of the virtual machine to be migrated and a PFN in a data sending request, thereby greatly reducing a utilization rate and time overhead of a processor in a physical host on which the virtual machine is located, and resolving, to some extent, a problem of a high utilization rate and high time overhead of the processor in the physical host on which the virtual machine is located in the prior art due to the need, in a process of virtual machine migration on a virtualization platform, of mapping memory of a virtual machine to a user-mode space and updating, by using a hypercall, a page table.

Embodiment 8

Figure 10:
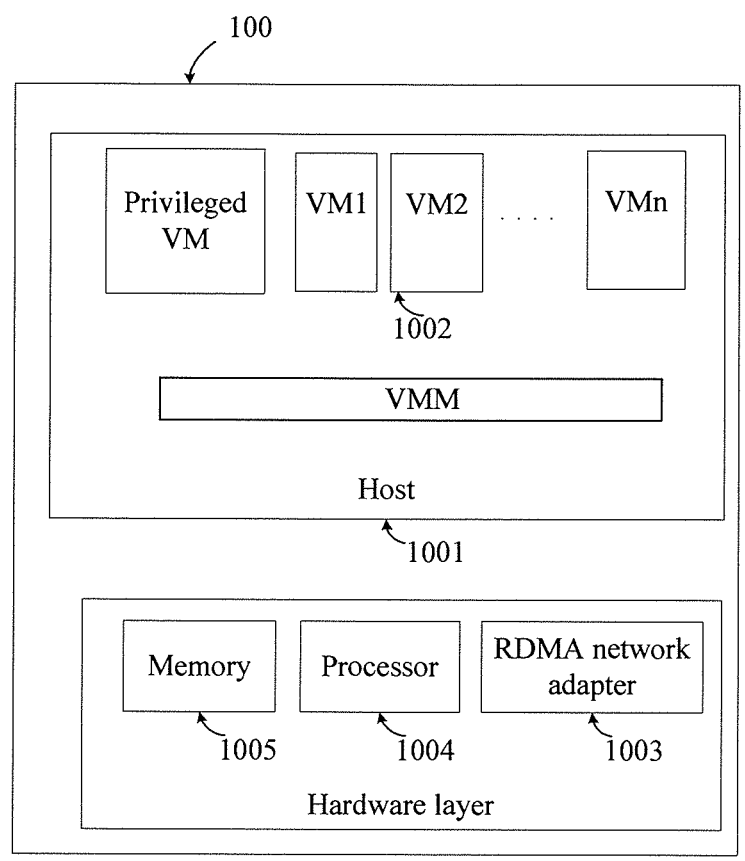
FIG. 10 is an apparatus schematic structural diagram of another physical host according to an embodiment of the present invention.
Figure 11:
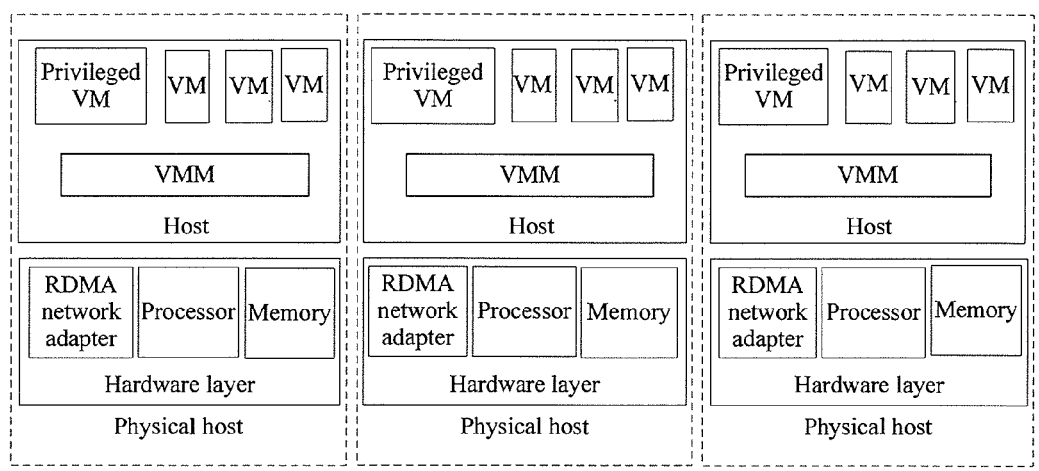
FIG. 11 is a schematic diagram of a cluster system according to an embodiment of the present invention.

An embodiment of the present invention provides another physical host 100. Referring to FIG. 10, the physical host 100 includes a hardware layer, a host 1001 running on the hardware layer, and at least one virtual machine VM 1002 running on the host 1001, where the hardware layer includes an RDMA network adapter 1003, and optionally, may further include a processor 1004 and a memory 1005. The host may include a VMM running on the physical host 100 and a privileged virtual machine running on the VMM; and the virtual machine 1002 is a virtual machine on the physical host 100 other than the privileged virtual machine. The virtual machine 1002 includes a first virtual machine.

The host 1001 is configured to:

obtain a data sending request for sending memory data of a first virtual machine, where the data sending request includes an identity of the first virtual machine and a PFN of the memory data that is requested to be sent;

query a correspondence information base according to the identity of the first virtual machine to obtain a correspondence of the first virtual machine, where the correspondence information base includes a correspondence of a virtual machine to be migrated, and the correspondence of the virtual machine is a correspondence established between a PFN of memory of the virtual machine and a physical memory page address of the memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine;

query the obtained correspondence of the first virtual machine according to the PFN of the memory data that is requested to be sent, so as to obtain a physical memory page address of the memory data that is requested to be sent; and send, to a destination physical host by using the RDMA network adapter 1003, memory data stored at the obtained physical memory page address of the memory data that is requested to be sent.

Further, the host 1001 is further configured to:

before obtaining the data sending request for sending the memory data of the first virtual machine, obtain a migration request that is triggered by a user process of a privileged virtual machine and used for migrating the memory data of the first virtual machine, where the migration request includes the identity of the first virtual machine;

obtain an address space of memory of the first virtual machine according to the identity of the first virtual machine in the migration request;

obtain a PFN of the memory of the first virtual machine according to the address space;

calculate a physical memory page address of the memory of the first virtual machine according to the PFN of the memory of the first virtual machine; and establish a correspondence between the PFN of the memory of the first virtual machine and the physical memory page address of the memory of the first virtual machine.

Further, the host 1001 is further configured to:

register the physical memory page address of the memory data of the first virtual machine with the RDMA network adapter, which may be specifically implemented in any one of the following two manners:

1. After calculating the physical memory page address of the memory of the first virtual machine according to the PFN of the memory of the first virtual machine and before obtaining the data sending request for sending the memory data of the first virtual machine, register the physical memory page address of the memory of the first virtual machine with the RDMA network adapter.

In this manner, the host 1001 registers physical memory page addresses of all memory of the first virtual machine with the RDMA network adapter at a time. For example, the physical memory page addresses corresponding to all memory of the first virtual machine are 0x00010000 to 0x0001ffff; and correspondingly, the host 1001 registers all 0x00010000 to 0x0001ffff with the RDMA network adapter at a time.

2. After querying the correspondence of the first virtual machine according to the PFN of the memory data that is requested to be sent, so as to obtain the physical memory page address of the memory data that is requested to be sent, and before sending, to the destination physical host by using the RDMA network adapter, the memory data stored at the physical memory page address of the memory data that is requested to be sent, register, with the RDMA network adapter, the physical memory page address of the memory data that is requested to be sent.

In this manner, the host 1001 registers, with the RDMA network adapter in batches according to each data sending request, physical memory page addresses of memory data that is requested by each data sending request to send. For example, physical memory page addresses corresponding to all memory of the first virtual machine are 0x00010000 to 0x0001ffff, and physical memory page addresses of memory data that is requested by a first data sending request to send are 0x00010000 to 0x000100ff; and correspondingly, after the first data sending request is obtained and before memory data stored at the physical memory page addresses 0x00010000 to 0x000100ff is sent to a destination physical host by using the RDMA network adapter, the host 1001 registers the physical memory page addresses 0x00010000 to 0x0001ffff with the RDMA network adapter. For another example, physical memory page addresses of memory data that is requested by a second data sending request to send are 0x00010100 to 0x000101ff; and correspondingly, after the second data sending request is obtained and before memory data stored at the physical memory page addresses 0x00010100 to 0x000101ff is sent to a destination physical host by using the RDMA network adapter, the host 1001 registers the physical memory page addresses 0x00010100 to 0x000101ff with the RDMA network adapter.

The physical host 100 provided by this embodiment of the present invention is configured to obtain a data sending request for sending memory data of a first virtual machine, where the data sending request includes an identity of the first virtual machine and a PFN of the memory data that is requested to be sent; and the host queries a correspondence information base according to the identity of the first virtual machine to obtain a correspondence of the first virtual machine, where the correspondence information base includes a correspondence of a virtual machine to be migrated, and the correspondence of the virtual machine is a correspondence established between a PFN and a physical memory page address of memory of the virtual machine after an address space of the memory of the virtual machine, PFN of the memory of the virtual machine corresponding to the address space, and the physical memory page address of the memory of the virtual machine corresponding to the PFN of the memory of the virtual machine are obtained based on an identity of the virtual machine; therefore, the correspondence of the first virtual machine can be queried according to the PFN of the memory data that is requested to be sent, so as to obtain a physical memory page address of the memory data that is requested to be sent; and memory data stored at the physical memory page address of the memory data that is requested to be sent is then sent to a destination physical host by using an RDMA network adapter. In this way, in a process of virtual machine migration, it is unnecessary to map memory of a virtual machine to a user-mode space and to update a page table by using a hypercall; a physical memory page address corresponding to memory data that is requested to be sent can be directly obtained by querying according to a correspondence of the virtual machine to be migrated and a PFN in a data sending request, thereby greatly reducing a utilization rate and time overhead of a processor in a physical host on which the virtual machine is located, and resolving, to some extent, a problem of a high utilization rate and high time overhead of the processor in the physical host on which the virtual machine is located in the prior art due to the need, in a process of virtual machine migration on a virtualization platform, of mapping memory of a virtual machine to a user-mode space and updating, by using a hypercall, a page table.

Embodiment 9

An embodiment of the present invention provides a cluster system. Referring to FIG. 10, the cluster system includes a plurality of physical hosts, where the plurality of physical hosts include a source physical host and a destination physical host, and each physical host includes a hardware layer, a host running on the hardware layer, and at least one virtual machine VM running on the host, where the hardware layer includes an RDMA network adapter, and optionally, a processor and a memory. The host may include a VMM on a physical host on which the host is located and a privileged virtual machine running on the VMM.

For the physical host included in the cluster system in this embodiment of the present invention, refer to the physical hosts described in the foregoing embodiments, and details are not described herein again.

According to the cluster system in this embodiment of the present invention, a host in a source physical host is capable of obtaining a data sending request for sending memory data of a first virtual machine, where the data sending request includes an identity of the first virtual machine and a PFN of the memory data that is requested to be sent; and the host queries a correspondence information base according to the identity of the first virtual machine to obtain a correspondence of the first virtual machine, where the correspondence information base includes a correspondence of a virtual machine to be migrated, and the correspondence of the virtual machine is a correspondence established between a PFN and a physical memory page address of memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine; therefore, the host is capable of querying the correspondence of the first virtual machine according to the PFN of the memory data that is requested to be sent, so as to obtain a physical memory page address of the memory data that is requested to be sent, and then sending, to a destination physical host by using an RDMA network adapter, memory data stored at the physical memory page address of the memory data that is requested to be sent. In this way, in a process of virtual machine migration, it is unnecessary to map memory of a virtual machine to a user-mode space and to update a page table by using a hypercall; a physical memory page address corresponding to memory data that is requested to be sent can be directly obtained by querying according to a correspondence of the virtual machine to be migrated and a PFN in a data sending request, thereby greatly reducing a utilization rate and time overhead of a processor in a physical host on which the virtual machine is located, and resolving, to some extent, a problem of a high utilization rate and high time overhead of the processor in the physical host on which the virtual machine is located in the prior art due to the need, in a process of virtual machine migration on a virtualization platform, of mapping memory of a virtual machine to a user-mode space and updating, by using a hypercall, a page table.

It may be clearly understood by persons of skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the division of units is merely a division of logical functions and there may be other divisions in actual implementation. For example, a plurality of units or components may be combined or integrated into another system, or some features may be ignored or not performed. Furthermore, the displayed or discussed mutual couplings or direct couplings or communication connections may be implemented through some interfaces. The indirect couplings or communication connections between the apparatuses or units may be implemented in electronic, mechanical, or other fix ins.

The units described as separate parts may be or may not be physically separate, and parts displayed as units may be or may not be physical units, and may be located in one position or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented by hardware in addition to a software functional unit, or by hardware only.

The integrated unit implemented in the form of software functional unit may be stored in a computer readable storage medium. The software functional unit is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

Persons of ordinary skill in the art may understand that all or a part of the steps of the methods in the embodiments may be implemented by a program instructing relevant hardware (such as a processor). The program may be stored in a computer readable storage medium. The storage medium may include: a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for migrating memory data of a virtual machine, the method comprising:
    obtaining a data sending request for sending memory data of a first virtual machine, wherein the data sending request comprises an identity of the first virtual machine and a physical frame number PFN of the memory data that is requested to be sent;
    querying a correspondence information base according to the identity of the first virtual machine to obtain a correspondence of the first virtual machine, wherein the correspondence information base comprises a correspondence of a virtual machine to be migrated, and the correspondence of the virtual machine is a correspondence established between a PFN of memory of the virtual machine and a physical memory page address of the memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine;
    querying the correspondence of the first virtual machine according to the PFN of the memory data that is requested to be sent, so as to obtain a physical memory page address of the memory data that is requested to be sent; and
    sending, to a destination physical host by using a remote direct memory access RDMA network adapter, memory data stored at the physical memory page address of the memory data that is requested to be sent.

2. The method according to claim 1, wherein before obtaining the data sending request for sending the memory data of the first virtual machine, the method further comprises:
    obtaining a migration request that is triggered by a user process of a privileged virtual machine and used for migrating the memory data of the first virtual machine, wherein the migration request comprises the identity of the first virtual machine;
    obtaining an address space of memory of the first virtual machine according to the identity of the first virtual machine in the migration request;
    obtaining a PFN of the memory of the first virtual machine according to the address space; calculating a physical memory page address of the memory of the first virtual machine according to the PFN of the memory of the first virtual machine; and
    establishing a correspondence between the PFN of the memory of the first virtual machine and the physical memory page address of the memory of the first virtual machine.

3. The method according to claim 2, wherein after said calculating the physical memory page address of the memory of the first virtual machine according to the PFN of the memory of the first virtual machine and before said obtaining the data sending request for sending the memory data of the first virtual machine, the method further comprises:
    registering the physical memory page address of the memory of the first virtual machine with the RDMA network adapter.

4. The method according to claim 2, wherein after said querying the correspondence of the first virtual machine according to the PFN of the memory data that is requested to be sent, so as to obtain the physical memory page address of the memory data that is requested to be sent, and before said sending, to the destination physical host by using an RDMA network adapter, the memory data stored at the physical memory page address of the memory data that is requested to be sent, the method further comprises:
    registering, with the RDMA network adapter, the physical memory page address of the memory data that is requested to be sent.

5. The method according to claim 1, wherein after said querying the correspondence of the first virtual machine according to the PFN of the memory data that is requested to be sent, so as to obtain the physical memory page address of the memory data that is requested to be sent, and before said sending, to the destination physical host by using an RDMA network adapter, the memory data stored at the physical memory page address of the memory data that is requested to be sent, the method further comprises:
    registering, with the RDMA network adapter, the physical memory page address of the memory data that is requested to be sent.

6. The method according to claim 1, wherein obtaining the data sending request for sending the memory data of the first virtual machine comprises:

extracting data sending requests in a data sending request queue in sequence, wherein the data sending requests comprise data sending requests of different virtual machines to be migrated, and the data sending requests in the data sending request queue are sorted according to a sequence of time or priorities.

7. A physical host, comprising:

a memory that stores instructions; and a processor coupled to the memory and configured to execute the instructions to:

obtain a data sending request for sending memory data of a first virtual machine, wherein the data sending request comprises an identity of the first virtual machine and a physical frame number PFN of the memory data that is requested to be sent, query a correspondence information base according to the identity of the first virtual machine to obtain a correspondence of the first virtual machine, wherein the correspondence information base comprises a correspondence of a virtual machine to be migrated, and the correspondence of the virtual machine is a correspondence established between a PFN of memory of the virtual machine and a physical memory page address of the memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine, query the correspondence of the first virtual machine according to the PFN of the memory data that is requested to be sent, so as to obtain a physical memory page address of the memory data that is requested to be sent, and send, to a destination physical host by using a remote direct memory access (RDMA) network adapter, memory data stored at the physical memory page address of the memory data that is requested to be sent.

8. The physical host according to claim 7, before obtaining the data sending request for sending the memory data of the first virtual machine, the processor is further configured to:

obtain a migration request that is triggered by a user process of a privileged virtual machine and used for migrating the memory data of the first virtual machine, wherein the migration request comprises the identity of the first virtual machine;

obtain an address space of memory of the first virtual machine according to the identity of the first virtual machine in the migration request;

obtain a PFN of the memory of the first virtual machine according to the address space;

calculate a physical memory page address of the memory of the first virtual machine according to the PFN of the memory of the first virtual machine; and establish a correspondence between the PFN of the memory of the first virtual machine and the physical memory page address of the memory of the first virtual machine.

9. The physical host according to claim 8, after calculating the physical memory page address of the memory of the first virtual machine according to the PFN of the memory of the first virtual machine and before obtaining the data sending request for sending the memory data of the first virtual machine, the processor is further configured to:

register the physical memory page address of the memory of the first virtual machine with the RDMA network adapter.

10. The physical host according to claim 8, wherein after querying the correspondence of the first virtual machine according to the PFN of the memory data that is requested to be sent, so as to obtain the physical memory page address of the memory data that is requested to be sent, and before sending, to the destination physical host by using the RDMA network adapter, the memory data stored at the physical memory page address of the memory data that is requested to be sent, the processor is further configured to:

register, with the RDMA network adapter, the physical memory page address of the memory data that is requested to be sent.

11. The physical host according to claim 7, wherein after querying the correspondence of the first virtual machine according to the PFN of the memory data that is requested to be sent, so as to obtain the physical memory page address of the memory data that is requested to be sent, and before sending, to the destination physical host by using the RDMA network adapter, the memory data stored at the physical memory page address of the memory data that is requested to be sent, the processor is further configured to:

register, with the RDMA network adapter, the physical memory page address of the memory data that is requested to be sent.

12. The physical host according to claim 7, wherein the processor is further configured to: extract data sending requests in a data sending request queue in sequence, wherein the data sending requests comprises data sending requests of different virtual machines to be migrated, and the data sending requests in the data sending request queue are sorted according to a sequence of time or priorities.

13. A physical host, comprising a hardware layer, a host running on the hardware layer, and at least one virtual machine (VM) running on the host, wherein the hardware layer comprises a remote direct memory access RDMA network adapter, the at least one virtual machine comprises a first virtual machine, and the host is configured to:

obtain a data sending request for sending memory data of the first virtual machine, wherein the data sending request comprises an identity of the first virtual machine and a physical frame number PFN of the memory data that is requested to be sent;

query a correspondence information base according to the identity of the first virtual machine to obtain a correspondence of the first virtual machine, wherein the correspondence information base comprises a correspondence of a virtual machine to be migrated, and the correspondence of the virtual machine is a correspondence established between a PFN of memory of the virtual machine and a physical memory page address of the memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine;

query the correspondence of the first virtual machine according to the PFN of the memory data that is requested to be sent, so as to obtain a physical memory page address of the memory data that is requested to be sent; and send, to a destination physical host by using the remote direct memory access RDMA network adapter, memory data stored at the physical memory page address of the memory data that is requested to be sent.

14. The physical host according to claim 13, wherein the host is further configured to:

before obtaining the data sending request for sending the memory data of the first virtual machine, obtain a migration request that is triggered by a user process of a privileged virtual machine and used for migrating the memory data of the first virtual machine, wherein the migration request comprises the identity of the first virtual machine;

obtain an address space of memory of the first virtual machine according to the identity of the first virtual machine in the migration request;

obtain a PFN of the memory of the first virtual machine according to the address space;

calculate a physical memory page address of the memory of the first virtual machine according to the PFN of the memory of the first virtual machine; and establish a correspondence between the PFN of the memory of the first virtual machine and the physical memory page address of the memory of the first virtual machine.

15. The physical host according to claim 14, wherein the host is further configured to:

after calculating the physical memory page address of the memory of the first virtual machine according to the PFN of the memory of the first virtual machine, and before obtaining the data sending request for sending the memory data of the first virtual machine, register the physical memory page address of the memory of the first virtual machine with the RDMA network adapter.

16. The physical host according to claim 14, wherein after querying the correspondence of the first virtual machine according to the PFN of the memory data that is requested to be sent, so as to obtain the physical memory page address of the memory data that is requested to be sent, and before sending, to the destination physical host by using the RDMA network adapter, the memory data stored at the physical memory page address of the memory data that is requested to be sent, the host is further configured to:

register, with the RDMA network adapter, the physical memory page address of the memory data that is requested to be sent.

17. The physical host according to claim 13, wherein after querying the correspondence of the first virtual machine according to the PFN of the memory data that is requested to be sent, so as to obtain the physical memory page address of the memory data that is requested to be sent, and before sending, to the destination physical host by using the RDMA network adapter, the memory data stored at the physical memory page address of the memory data that is requested to be sent, the host is further configured to:

register, with the RDMA network adapter, the physical memory page address of the memory data that is requested to be sent.

18. A cluster system, comprising a plurality of physical hosts, wherein the plurality of physical hosts comprise a source physical host and a destination physical host, and wherein the source physical host comprises:

an RDMA network adapter;

a memory that stores instructions; and a processor coupled to the memory and configured to execute the instructions to:

obtain a data sending request for sending memory data of a first virtual machine, wherein the data sending request comprises an identity of the first virtual machine and a physical frame number PFN of the memory data that is requested to be sent;

query a correspondence information base according to the identity of the first virtual machine to obtain a correspondence of the first virtual machine, wherein the correspondence information base comprises a correspondence of a virtual machine to be migrated, and the correspondence of the virtual machine is a correspondence established between a PFN of memory of the virtual machine and a physical memory page address of the memory of the virtual machine after an address space of the memory of the virtual machine, the PFN of the memory of the virtual machine corresponding to the address space, and the physical memory page address of the memory of the virtual machine corresponding to the PFN of the memory of the virtual machine are obtained based on an identity of the virtual machine;

query the correspondence of the first virtual machine according to the PFN of the memory data that is requested to be sent, so as to obtain a physical memory page address of the memory data that is requested to be sent; and send, to a destination physical host by using a remote direct memory access (RDMA) network adapter, memory data stored at the physical memory page address of the memory data that is requested to be sent.

* * * * *